United States Patent [19]
McIntosh

[11] 3,905,029
[45] Sept. 9, 1975

[54] METHOD AND APPARATUS FOR ENCODING AND DECODING DIGITAL DATA

[75] Inventor: Duane E. McIntosh, Santa Ynez, Calif.

[73] Assignee: General Motors Corporation, Detroit, Mich.

[22] Filed: Oct. 9, 1973

[21] Appl. No.: 404,231

Related U.S. Application Data

[63] Continuation-in-part of Ser. No. 292,141, Sept. 26, 1972, abandoned, which is a continuation of Ser. No. 94,032, Dec. 1, 1970, abandoned.

[52] U.S. Cl. ............... 340/347 DD; 360/41; 360/44
[51] Int. Cl.² ..................... H03K 13/00; H04L 3/00
[58] Field of Search ............. 340/174.1 G, 347 DD; 346/74 M; 360/41, 44

[56] References Cited

UNITED STATES PATENTS

| | | | |
|---|---|---|---|
| 3,374,475 | 3/1968 | Gabor | 340/174.1 G |
| 3,488,663 | 1/1970 | Rosenblatt | 346/74 M |
| 3,564,557 | 2/1971 | Ruthazer | 340/347 DD |
| 3,623,041 | 11/1971 | MacDougall | 340/174.1 G |
| 3,691,553 | 9/1972 | McIntosh | 340/347 DD |

*Primary Examiner*—R. Stephen Dildine, Jr.
*Attorney, Agent, or Firm*—Albert F. Duke

[57] ABSTRACT

A coding system in which transitions are produced at either the beginning or middle of selected bit cells to represent binary data. A transition at the beginning of a bit cell represents a pair of adjacent bits forming one of the four possible two bit configurations. A transition at the middle of a bit cell represents a pair of adjacent bits forming a second of the four possible two bit configurations. The remaining data is represented by the absence of a transition. The pairs of two bit configurations selected to produce the transitions may be either 00,11; 10,01; 11,10; or 00,01, the criteria being that the second bits of each pair be complementary.

32 Claims, 13 Drawing Figures

METHOD AND APPARATUS FOR ENCODING AND DECODING DIGITAL DATA

This is a continuation-in-part of my copending application Ser. No. 292,141, filed Sept. 26, 1972, and now abandoned which in turn is a continuation of my U.S. Pat. application Ser. No. 94,032, filed Dec. 1, 1970, and now abandoned.

This invention relates to digital data transmitting or recording systems and more particularly to methods and apparatus for encoding and decoding digital data which permit transmission of data at speeds significantly above present achievable rates within a bandwidth limited channel, or the achievement of significantly higher packing density on a storage medium.

It is contemplated broadly that a coding system embodying the present invention can be utilized to advantage in numerous different types of data recording and readback systems, as well as in communication systems in which the information being handled is coded and decoded essentially simultaneously at different locations, as in pulse code modulation telephone equipment and the like. However, the invention will be described primarily as applied to data recording equipment and typically to recording equipment of the magnetic type.

It is common practice in the art of digital data recording to represent the data in binary form by various combinations and/or timings of transitions between two stable states. In the storage of information the primary objective is to accurately record and retrieve the desired information. However, it is becoming increasingly important to increase the amount of data which can be stored in a given lineal distance of a storage medium, such as magnetic tape, disk or drum. This latter feature is commonly referred to as information "packing density" and is normally expressed in bits per inch, that is, the number of bits which can be stored with respect to an inch of storage medium. The medium employed in the storage of binary information exhibits a hysteresis characteristic having two stable states comprising two directions of magnetic orientation of portions of the medium. The information is stored on the medium by a recording head which creates magnetic fields in one or the other of two directions in accordance with the information to be written on reversals medium. Usually, the medium is broken up into a plurality of predefined equal length portions called bit cells which serve as identifying boundaries for each bit of information. The information thus stored on the medium is recovered by providing relative movement between the medium and a transducer which detects the polarity changes of discrete areas of the medium's surface. The detected pattern of flux reversals taken in conjunction with an additional parameter, for example, time or position, is indicative of the information stored and the pattern of flux reversalts is commonly referred to as a code.

Certain types of encoding such as double frequency encoding involve producing two transitions within a bit cell, one at the leading edge and the other at the center to represent a binary 1, while providing a single transition at the leading edge of a bit cell to represent a binary 0. With the double frequency method of encoding the minimum spacing between transitions is one-half bit cell while the maximum spacing between transitions is one bit cell. Since the packing density is directly related to the minimum spacing between transitions, high packing densities are difficult to obtain with the double frequency method. Another encoding method represents a binary 1 by a single transition at the midpoint of a bit cell and a binary 0 by a single transition at the leading edge of a bit cell unless the binary 0 immediately follows a binary 1 in which event the transition which would normally be provided to represent the binary 0 is skipped. This method is disclosed, for example, in the patent to Jacoby U.S. Pat. No. 3,414,894 and produces a minimum spacing between transitions of one bit cell and a maximum spacing between transitions of two bit cells. Proposals for minimizing bit shift or peak shift during the recording of data in accordance with this method are disclosed in the patents to Francini U.S. Pat. No. 3,569,047 and MacDougall, Jr. U.S. Pat. No. 3,623,041. The method disclosed in Jacoby is modified in Francini by additionally skipping a transition which would normally represent a binary 0 if the binary 0 immediately follows a binary 0. In other words, the transition to represent a binary 0 is only provided if the binary 0 immediately follows a bit cell in which a transition has not already occurred either at the beginning or the middle of the bit cell. MacDougall, Jr. proposes a modification of the Francini method by skipping a transition which would normally represent a binary 1 if the binary 1 is preceded by 01 and followed by a 0. In addition, no transition is provided for the binary 0 which follows the binary 1 which has been skipped in the 0110 bit configuration. While the Francini and MacDougall, Jr. patents are directed toward solving the bit shift problem resulting from particular plural bit configurations, their encoding methods are still limited by the fact that the minimum spacing between transitions is one bit cell as in Jacoby and occurs when coding a string of binary 1's.

Other attempts to increase the packing density have centered around representing a pair of bits by each recorded symbol. Examples of such bit pair coding techniques are disclosed in the patent to Gabor U.S. Pat. No. 3,374,475, Lawrance et al. U.S. Pat. No. 3,281,806, and Perkins, Jr. U.S. Pat. No. 3,573,766. In such bit pair coding techniques, the data to be encoded is grouped in pairs of bits, i.e., a set of bits constitutes two successive bits in the data stream. The number of possible two bit configurations is four and, accordingly, four different symbols are utilized to express all these combinations, each symbol designating a particular combination of two bits. In Gabor each of the four possible two bit configurations is represented by the presence or absence of flux transition in three successive or adjacent positions in the magnetic track. In Lawrance, a particular pulse width is assigned to each of the four possible two bit configurations, and in Perkins, Jr. four unique amplitudes, phases, or frequencies are proposed to represent the respective pairs of bits.

The present invention represents an improvement over the prior art by providing methods and apparatus for coding data in a manner which produces a minimum spacing between transitions of 1½ bit cells. The invention is based on the premise that if two of the four possible two bit configurations are uniquely identified the remaining data is deducible from the pairs uniquely identified. By increasing the minimum spacing between transitions from one bit cell to 1½ bit cells a significant increase in packing density may be achieved. Also, data may be transmitted at higher speeds over bandwidth limited communication links such as conventional telephone lines. In accordance with a preferred embodiment of the present invention a bit-by-bit evaluation of the digital data is made and a transition from the existing level of a bilevel signal to the other level of the bilevel signal is produced upon detection of either of the two selected bit pairs. The selection of the two bit pairs of the four bit pairs available is based on the criteria that the second bits of each pair be complementary, i.e., the two bit pairs may be 00, 11; 01, 10; 00, 01; and 11, 10. This transition encodes both bits and neither bit is used again in the encoding process. For example, a transition at the beginning of one of the two bit cells containing the two bit configuration 11 would encode both 1's and a transition at the middle of one of the two bit cells containing the two bit configuration 00 would encode both 0's. Alternatively, the bit pairs 10, 01; 11, 10; or 00, 01 may be selected to cause the transitions at the beginning and middle of a bit cell. Either one of the bit pairs of the four sets of bit pairs mentioned above may be selected to produce the transition at the beginning of a bit cell and the other bit pair would produce a transition at the middle of a bit cell and the transition may occur during the first or the second bit cell of each pair as long as the same convention is used throughout the encoding. In each event, transitions in the encoded waveform will be separated by a minimum of 1½ bit cells. Further, the pair of transitions separated by 1½ bit cells are unique in that the first transition of the pair always occurs at the middle of a bit cell and the second transition of the pair always occurs at the beginning of a bit cell, i.e. the two transitions do not occur in adjacent bit cells.

In accordance with another embodiment of the invention this uniqueness is utilized to reduce the maximum spacing between transitions to 4½ bit cells thereby raising the lowest frequency content of the encoded data signal.

It is therefore an object of the present invention to provide improved methods and apparatus for encoding and decoding binary data.

It is another object of the present invention to provide methods and apparatus for encoding and decoding digital data which more advantageously utilize the available bandwidth of a communications or recording medium.

It is another object of the present invention to provide methods and apparatus for accurate communication and storage of binary data of a high packing density.

It is another object of the present invention to provide methods and apparatus for high speed transmission of binary data.

Another object of the present invention is to provide an improved encoding system which generates a bilevel waveform in which transitions between the two levels are spaced by a minimum of 1½ bit cells.

Another object of the present invention is to provide an improved encoding system which generates a bilevel waveform in which transitions between the two levels are spaced by a minimum of 1½ bit cells and a maximum of 4½ bit cells.

A more complete understanding of the present invention may be had from the following detailed description in conjunction with the drawings in which.

Figure 1:
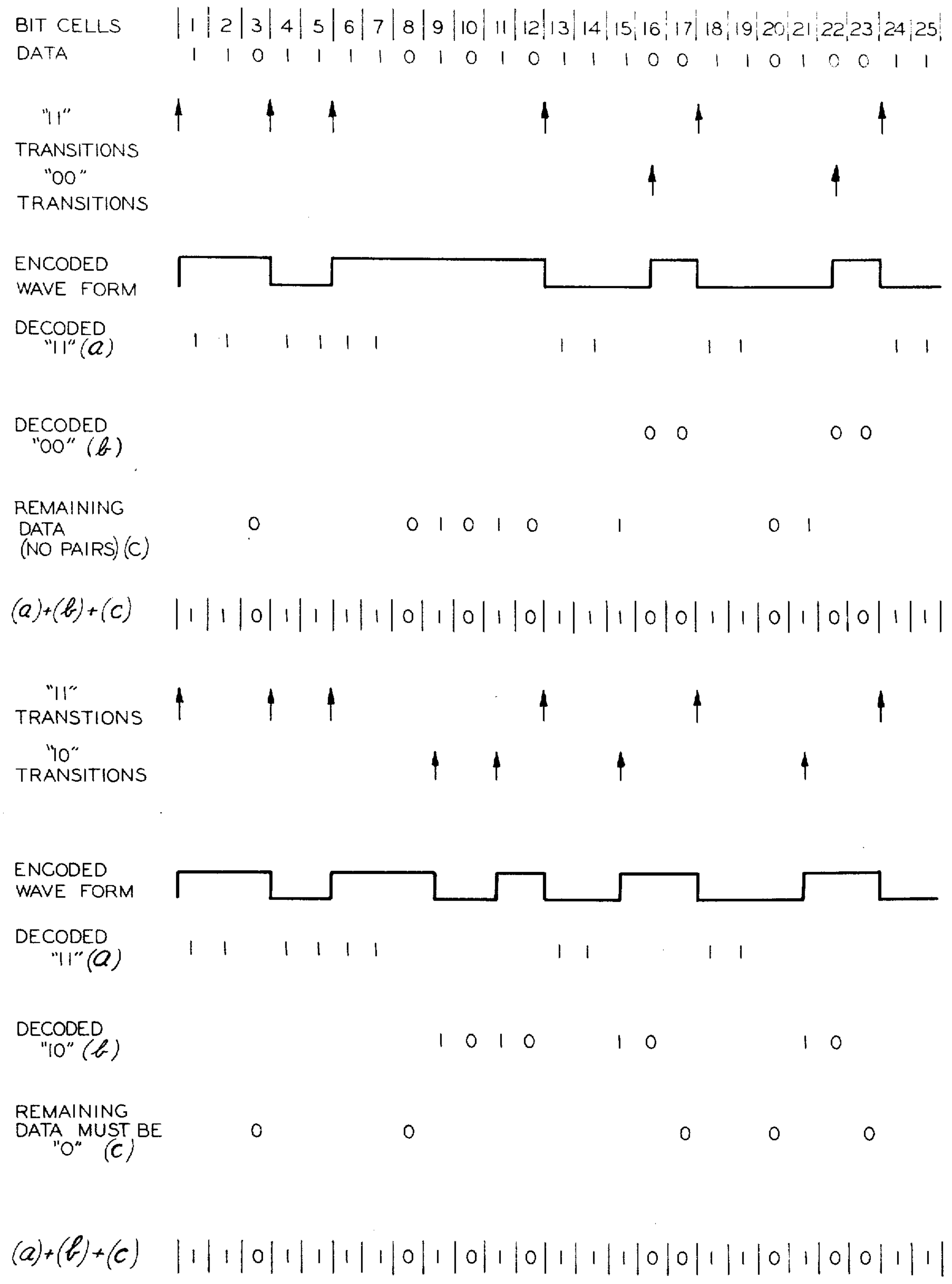
FIG. 1 illustrates the waveform generated in accordance with the encoder of the present invention.

Referring now to the drawings and initially to FIG. 1, the coded waveform generated by the encoder of the present invention during the coding of data consisting of 25 bits, namely 1101111010101110011010011 (reading left to right) is shown. In the first example a transition is provided at the beginning of a bit cell containing an uncoded binary 1 if the bit cell is followed by a bit cell containing a binary 1. A transition is provided at the middle of a bit cell containing an uncoded binary 0 if the bit cell is followed by a bit cell containing a binary 0. Since a transition at the beginning or middle of a bit cell codes both the bit contained in that cell as well as the bit contained in the following cell an "uncoded" binary 1 or 0 is a bit contained in a bit cell which is preceded by a bit cell which does not contain a transition.

Examining the data on a bit-by-bit basis it will be noted that a transition should be provided at the beginning of bit cells 1, 4, 6, 13, 18, and 24 to represent the pairs of adjacent 1's. The pair of adjacent 1's occurring in bit cells 5 and 6 do not produce a transition since the binary 1 in bit cell 5 has already been encoded by the transition occurring at the beginning of bit cell 4. The same reasoning applies to the pair of adjacent 1's appearing in bit cells 14 and 15. Also, examining the data on a bit-by-bit basis, transitions should occur at the middle of bit cells 16 and 22 to represent the pairs of 0's in bit cells 16, 17, and 22–23. The encoded waveform will thus appear as shown in FIG. 1. From the encoded waveform the pairs of 1's and pairs of 0's may be directly decoded from the transitions occurring in the waveform. This data is identified by (*a*) and (*b*) respectively. Since transitions occur only on pairs of 1's or pairs of 0's the remaining data is known to include no pairs of like bits and is deducible from the data directly decoded. Thus, a 0 must occur in bit cell 3 because if bit cell 3 contained a 1 then a pair of 1's would have been contained in bit cells 3 and 4 and a transition would have occured at the beginning of bit cell 3. For the same reason a 0 must occur in bit cell 12. Accordingly, the data in bit cells 8–11 must be 0101 in order to insure that no pairs of adjacent 1's or 0's are contained in bit cells 8–12. Similarly, bit cell 15 must contain a 1 for if bit cell 15 contained a 0 a transition would have occurred at the middle of bit cell 15. The same reasoning dictates that bit cell 21 contains a 1 and, accordingly, bit cell 20 must contain a 0. The remaining data is identified by (*c*). By AND'ing the data in (*a*), (*b*), and (*c*) the original data is obtained.

The encoding technique utilized in accordance with this first example may be summarized as follows: A transition is provided at the beginning of a bit cell which contains an uncoded 1 if the bit cell is followed by a bit cell containing a 1 and a transition is provided at the middle of a bit cell containing an uncoded 0 if the bit cell is followed by a bit cell containing a 0. An uncoded binary 1 which is followed by a binary 1 and an uncoded binary 0 which is followed by a binary 0 are elsewhere referred to in the specification and claims as "discrete" pairs of 1's or "discrete" pairs of 0's.

The decoding of the encoded data may be summarized as follows: A binary 1 should be registered in a bit cell containing a transition at the beginning of the bit cell and a binary 1 should be registered in the following bit cell; a binary 0 should be registered in a bit cell containing a transition at the middle of the bit cell and a binary 0 should be registered in the following bit cell; a binary 1 or a 0 should be registered in the remaining bit cells so that no pairs of adjacent like bits are registered in the remaining bit cells and the binary characterization registered in the bit cell of the remaining bit cells which precedes a bit cell containing a transition is the complement of the binary characterization registered in the bit cell containing the transition.

In the second example the same data is encoded by having transitions occur at the beginning of a bit cell containing an uncoded binary 1 which is followed by a binary 1 and at the middle of a bit cell containing an uncoded binary 1 which is followed by a binary 0. Accordingly, transitions occur at the beginning of bit cells 1, 4, 6, 13, 18, and 24 and at the middle of bit cells 9, 11, 15, and 21 to produce the encoded waveform shown. While bit cells 2 and 3 contain the bit pair 10 no transition is produced because the bit in bit cell 2 has already been encoded by the transition at the beginning of bit cell 1. Another example of this is shown in bit cells 7 and 8. In this example, it will be noted that the remaining bits of data not encoded by a transition are all 0's. Thus, as shown in (*c*) the data in bit cells 3, 8, 17, 20, and 23 must be a 0 for otherwise a transition would have occurred at the beginning of each of these bit cells since a 1 occurs in the following bit cell. The technique employed in this latter encoding example may be summarized as follows: A transition should be provided at the beginning of a bit cell which contains an uncoded 1, if that bit cell is followed by a bit cell which contains a 1 and a transition should be provided at the middle of a bit cell which contains an uncoded 1 if that bit cell is followed by a bit cell which contains a 0. In other words, a transition is provided in each bit cell containing an uncoded 1 and occurs at the beginning or middle thereof depending upon whether the following bit cell contains a 1 or a 0 respectively. Decoding of the encoded data may be summarized as follows: A binary 1 should be registered in each bit cell containing a transition and a binary 1 or 0 should be registered in the following bit cell depending upon whether the transition in the previous bit cell occurred at the beginning or middle respectively of the bit cell, and binary 0's should be registered in the remaining bit cells.

It will be noted that the waveforms generated in both the examples given have a minimum spacing between consecutive transitions of 1½ bit cells. In the first example this occurs at bit cells 16, 18, and 22, 24 where a pair of 0's is followed by a pair of 1's. In the second example it occurs at bit cells 11, 13 where the bit pair 10 is followed by the pair 11. Moreover, it will be noted that the pairs of transitions separated by 1½ bit time intervals do not occur in adjacent bit cells. Also, in the example given the first of the pair of transitions always occurs in the middle of a bit cell and the second of the pair of transitions always occurs at the beginning of a bit cell.

Figures 2, 2A:
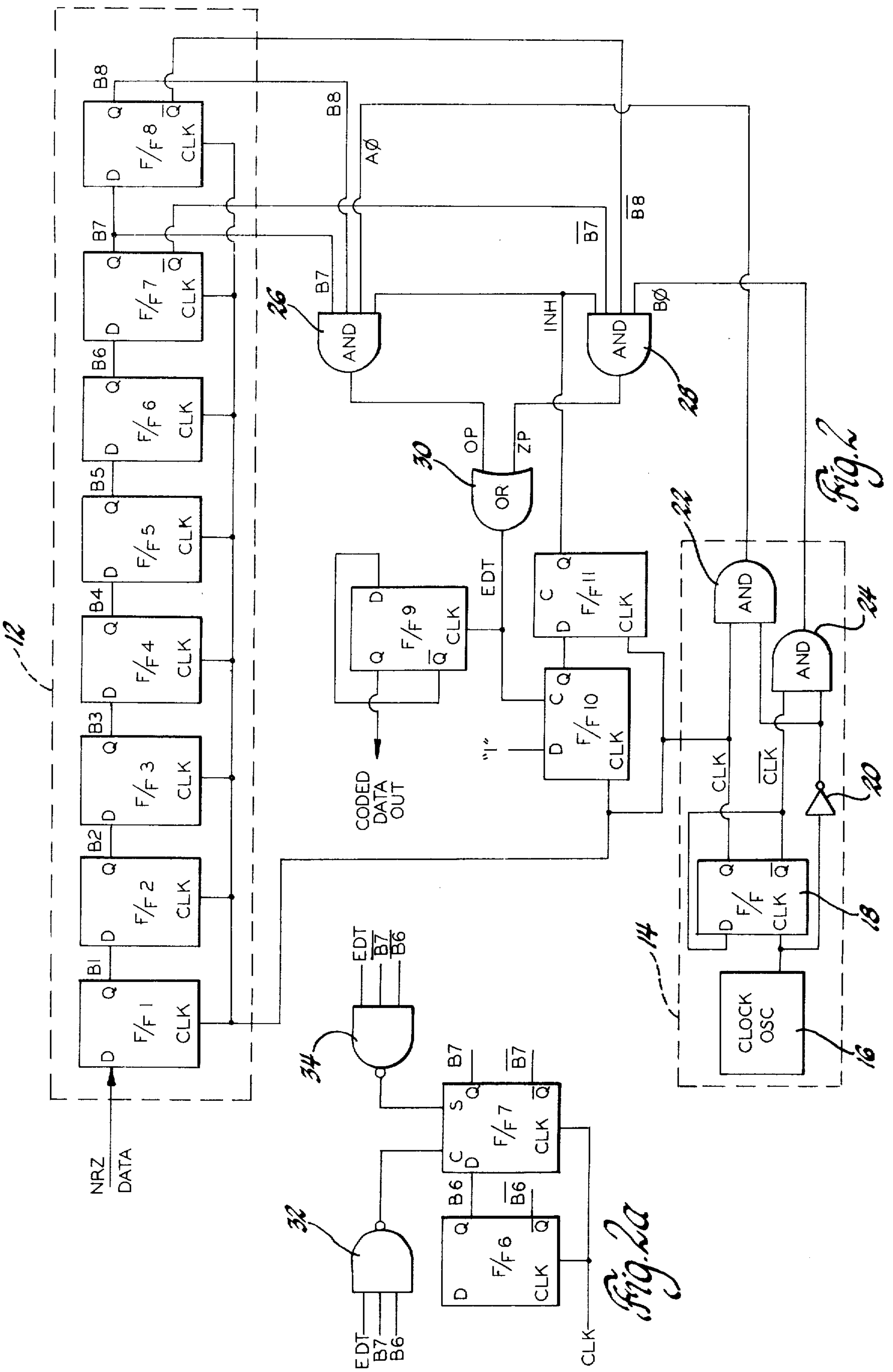
FIG. 2 is a logic diagram of one embodiment of the encoder of the present invention.
FIG. 2a illustrates a modification of the diagram of FIG. 1.

Referring to FIG. 2, logic for implementing the first example of FIG. 1 includes an input data register 12, illustrated by way of example as including eight flip-flops F/F-1 through F/F-8. These flip-flops are delay or D type flip-flops which transfer whatever logic levels are present at their respective D input terminals to their respective Q output terminals when enabled by a 0 to 1 transition of a clock pulse. The non-return-to-zero input bit stream present at flip-flop F/F-1 is clocked into the subsequent flip-flops F/F-2 through F/F-8 by clock pulses developed in pulse generating means generally designated 14. The generator 14 includes a clock oscillator 16 synchronized with the NRZ input data and operating at a frequency of twice bit rate frequency. The output of the clock 16 is counted down by a D type flip-flop 18 which produces clock pulses designated CLK and $\overline{CLK}$ at the Q and $\overline{Q}$ terminals respectively. The output of the clock oscillator 16 is also fed through an inverter 20 to AND gates 22 and 24 which are also connected with the Q and $\overline{Q}$ terminals of flip-flop 18. The output of AND gate 22 is a first timing pulse train designated A0 having logic level transitions from 0 to 1 which establish the beginning of a bit cell time (BCT) of the coded output bit stream as shown in FIG. 2. The output of the AND gate 24 is a second timing pulse train designated B0 having logic level transition from 0 to 1 at substantially the middle of the coded output bit cell time as shown in FIG. 2. As may be seen from FIG. 2 the leading edges of the A0 timing pulse train and B0 timing pulse train occur substantially after the NRZ data has been shifted by the CLK pulses which permits the register 12 to reach a quiescent state before sampling.

As previously indicated the coding of the NRZ bit stream is based on the detection of discrete pairs of bits in the input bit stream. By way of example the encoder of FIG. 2 is arranged to detect discrete pairs of 1's and 0's. This detection is accomplished by logic means including AND gates 26 and 28.

The AND gate 26 is connected with the Q output terminals of the flip-flops F/F-7 and F/F-8 and is enabled by the A0 timing pulses. The AND gate 28 is connected with the $\overline{Q}$ output terminals of the flip-flops F/F-7 and F/F-8 and is enabled by the B0 timing pulses. Thus the output of AND gate 26 changes from a 0 logic level to a 1 logic level when an A0 pulse is present and the outputs at the Q terminals of F/F-7 and F/F-8 are both 1's. Similarly, the output of AND gate 28 changes from a 0 logic level to a 1 logic level when a pulse from B0 is present and the outputs at the Q terminals of flip-flops F/F-7 and F/F-8 are 0's, since in that event the outputs of the $\overline{Q}$ terminals of F/F-7 and F/F-8 would be logic 1's. Accordingly, gate 26 detects pairs of 1's while gate 28 detects the inverse or complement of the pairs detected by gate 26, i.e. pairs of 0's.

The outputs of the AND gates 26 and 28 are fed to an OR gate 30, the output of which clocks a flip-flop F/F-9. For purposes of illustration the flip-flop F/F-9 is assumed to be set so that a 0 is present at the Q terminal and consequently, a 1 is present at the $\overline{Q}$ terminal and the D terminal due to the feedback connection between the $\overline{Q}$ and D terminals. Consequently, a clock pulse to the flip-flop F/F-9 causes a transition from a 0 logic level to a 1 logic level and any subsequent clock pulses alternate the output at the Q terminals between one logic level and the other.

The AND gates 26 and 28 also receive an input which is normally a logic 1 from flip-flops F/F-10 and F/F-11. For purposes of illustration the flip-flops F/F-10 and F/F-11 are assumed to be set so that a logic 1 appears at the output terminals Q. A logic 1 is continuously applied to the input terminal D of flip-flop F/F-10 and the flip-flops F/F-10 and F/F-11 are clocked from the Q terminal of flip-flop 18. The output of the OR gate 30 is connected with the clear terminal C of flip-flop F/F-10 and causes a logic 0 to be placed on the Q terminal of flip-flop F/F-10 and D terminal of flip-flop F/F-11 whenever a logic 1 is applied to the C terminal from the OR gate 30. Thus a logic level transition from a 0 to a 1 at the output of OR gate 30 causes a 0 to occur at the Q terminal of flip-flop F/F-11 for one bit cell time. The effect is to disable the AND gates 26 and 28 for one bit cell time following the detection of a pair of 0's or a pair of 1's.

Figure 3:
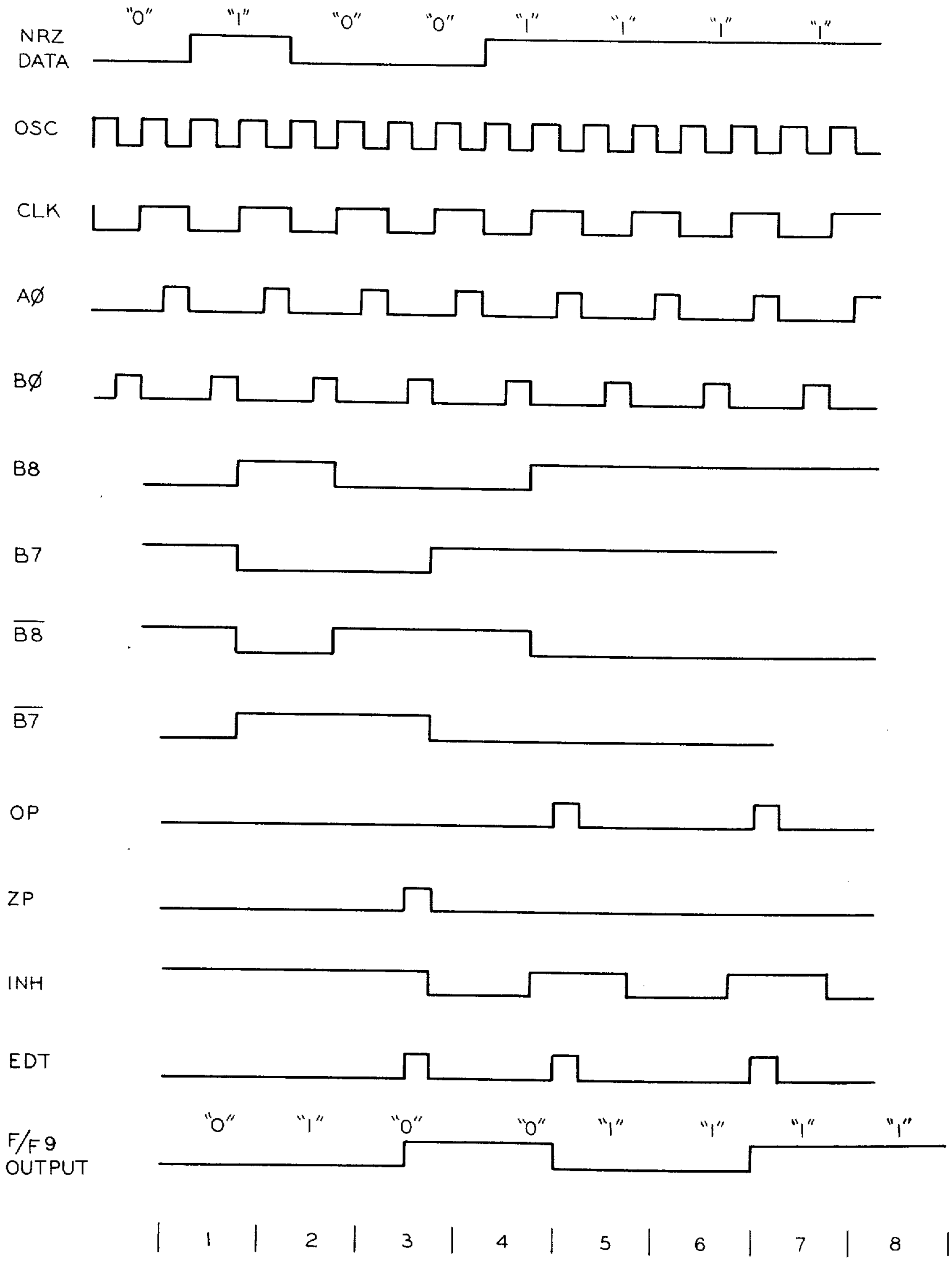
FIG. 3 is a waveform diagram showing somewhat idealized timing and data signals present in the operation of the circuitry of FIG. 2.

Assuming that the data loaded into the register 12 is as shown in FIG. 3; at BCT1 following the loading of the data, a logic level 0 is present at the Q terminal of flip-flop F/F-8 and a logic 1 is present at the Q terminal of flip-flop F/F-7. The inverse logic levels are of course present at the $\overline{Q}$ terminals of flip-flops F/F-8 and F/F-7 respectively. There being neither a pair of 1's nor a pair of 0's at the Q terminals of flip-flops F/F-7 and F/F-8, the 1's pair (OP) output of AND gate 26 and the 0's pair (ZP) output of AND gate 28 as well as the encoder trigger (EDT) output of the OR gate 30 are at logic level 0 as shown in FIG. 3. It will be noted from FIG. 3 that successive bits in the NRZ bit stream of the same logic level do not occur until BCT-3 at which time the Q terminal of flip-flops F/F-7 and F/F-8 are both 0's with corresponding 1's occurring at the $\overline{Q}$ terminals of flip-flops F/F-7 and F/F-8. The pair of 0's during BCT3 are detected by AND gate 28 as shown in waveform SP which is passed through the OR gate 30 to trigger the flip-flop F/F-9 causing a logic level transition from a 0 to a 1 to occur at the Q terminal of flip-flop F/F-9 and at the midpoint in the bit cell time due to the enabling of the AND gate 28 by the B0 timing pulse train. The clock pulse resulting from the pair of 0's detected clears the flip-flop F/F-10 placing a O on the D input of flip-flop F/F-11 which is transferred to the Q terminal of flip-flop F/F-11 on the next clock pulse (CLK) to inhibit the AND gates 26 and 28 for one bit cell time interval as shown in waveform INH. At the beginning of BCT5 a pair of 1's are detected by AND gate 26 generating another clock pulse to flip-flop F/F-9 and causing a transition at the output terminal Q of flip-flop F/F-9 at the beginning of BCT5 due to the enabling of the AND gate 26 by A0 timing pulses. The output of OR gate 30 also clears flip-flop F/F-10 so that the next clock pulse (CLK) inhibits AND gates 26 and 28 for one bit cell time interval. Thus, while at the beginning of BCT6 a pair of logic 1's appear at the Q terminals of flip-flops F/F-7 and F/F-8 the AND gate 26 is inhibited preventing a clock pulse to the flip-flop F/F-9. By inhibiting the AND gates 26 and 28 for one bit cell time interval following the detection of a pair of 0's or a pair of 1's the encoder insures that discrete pairs of 0's or 1's are detected rather than merely successive bits of 1's or 0's. For example, the bit pattern 111 contains only one discrete pair of 1's while the bit pattern 1111 contains two discrete pairs of 1's.

The state of the pairs which caused the transition at the Q terminal of flip-flop F/F-9 is apparent from an inspection of the time that the transition occurred with respect to bit cell time. Thus, the 0's and 1's in the input bit stream are immediately identifiable. In FIG. 2 the bits preceding the transition in BCT3 must logically be 01 rather than 10 since otherwise a transition would have occurred in the middle of BCT2. Apparatus for decoding the bit stream generated at the Q terminal of flip-flop F/F-9 is disclosed in my U.S. Pat. No. 3,691,553, filed Dec. 1, 1970, assigned to the assignee of the present invention, and is incorporated herein by reference.

The coded bit stream output from flip-flop F/F-9 shown in FIG. 3 is especially well adapted for recording on a magnetic medium to provide a high packing density of information. The bit stream has relatively few transitions considering the quantity of information involved. There is never more than one transition per 1½ bit cell times which occurs only during coding of 0011 combinations.

As previously indicated the invention is not limited to the detection of pairs of 0's or pairs of 1's but may easily be mechanized to detect the two bit configurations 01,10; 11,10; or 00,01. For example, to provide a transition at the beginning of a bit cell time for the two bit configuration 01 and a transition at the middle of a bit cell time for the two bit configuration 10 it is merely necessary to interchange the connections between the Q and $\overline{Q}$ terminals of flip-flop F/F-8 with the AND gates 26 and 28 so that the Q terminal of flip-flop F/F-8 is connected with the AND gate 28 and the $\overline{Q}$ terminal of flip-flop F/F-8 is connected with the AND gate 26.

Referring now to FIG. 2*a*, an alternate approach to the detection of discrete pairs is shown. In utilizing the FIG. 2*a* approach the flip-flops F/F-10 and F/F-11 are eliminated from FIG. 2 as are the inhibit inputs to the AND gates 26 and 28. In FIG. 2*a* the output of NAND gates 32 and 34 are connected with the CLEAR and SET inputs respectively of the flip-flop F/F-7. The inputs to the gate 32 are EDT, B6, and B7 and the inputs to the gate 34 are EDT, $\overline{B6}$ and $\overline{B7}$. Thus, if the discrete pair 11 is stored in F/F-7 and F/F-8 and is followed by a 1 stored in F/F-6, the resulting EDT pulse clears the flip-flop F/F-7 causing B7 to go low so that on the next clock pulse a 0 is shifted into F/F-8 and a 1 is shifted into F/F-7. Similarly, if the discrete pair 00 is stored in the flip-flops F/F-7 and F/F-8 and is followed by a 0 stored in F/F-6 the resulting EDT pulse will set the flip-flop F/F-7 through the gate 34 driving B7 to a 1 so that on the next clock pulse a 1 is shifted into F/F-8 and a 0 is shifted into F/F-7. The arrangement shown in FIG. 2*a* accomplishes the same purpose of the arrangement shown in FIG. 2 that being to prevent any bit from being encoded twice. In FIG. 2 the AND gates 26 and 28 are inhibited for one bit time following a transition regardless of the state of the bit following the discrete pair of like bits to ensure that the second bit in the pair of like bits, which has already been encoded, is not utilized in combination with the following bit to form a pair of like bits. In FIG. 2*a* the gates 26 and 28 are essentially inhibited by either clearing or setting F/F-7 upon detection of a discrete pair of like bits but only if the following bit is also like the pair of like bits. It is only when the bit following a discrete pair of like bits is of the same binary character as the discrete pair of like bits that it is necessary to inhibit the gates 26 and 28.

Figure 4:
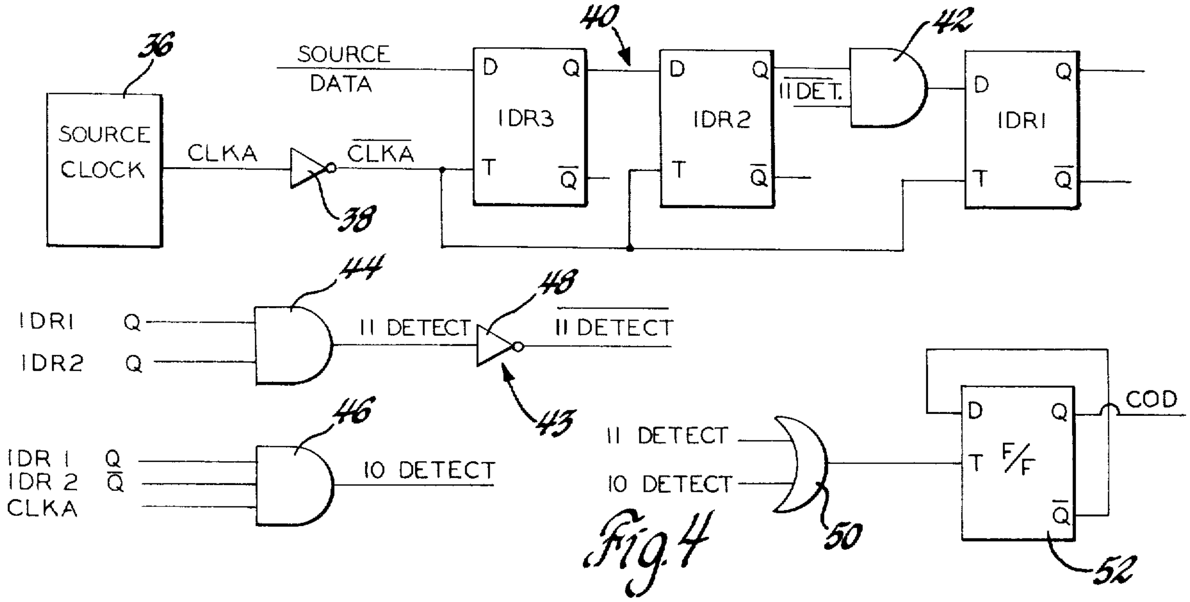
FIG. 4 is a logic diagram of another embodiment of the encoder of the present invention.
Figure 5:
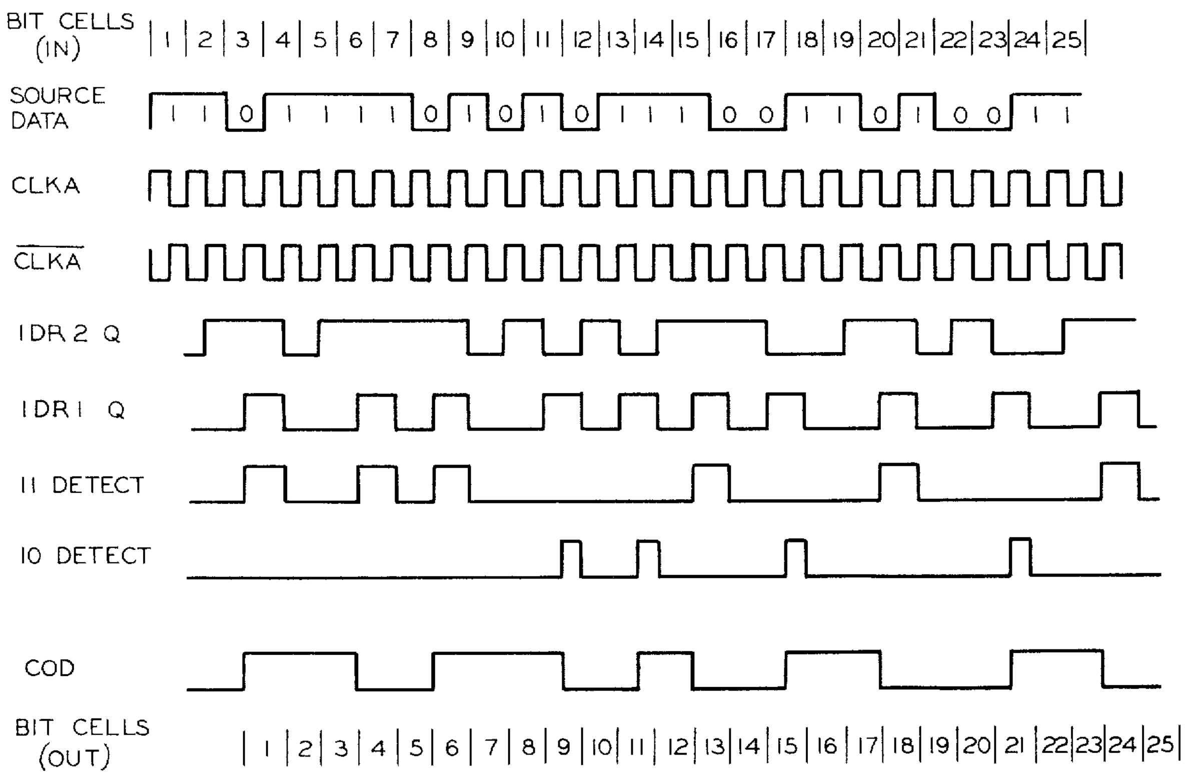
FIG. 5 is a waveform diagram showing somewhat idealized timing and data signals present in the operation of the circuitry of FIG. 4.

Referring now to FIG. 4, another embodiment of the invention is disclosed. In this embodiment of the invention the two bit configuration 11 produces a transition at the beginning of a bit cell and the two bit configuration 10 produces a transition at the middle of a bit cell. The circuits of FIGS. 2 and 4 may be utilized to control the energization of the coil of a magnetic recording head (not shown) as a conventional magnetic recording tape is advanced at a uniform rate past the recording head from a suitable supply reel to a motor operated take-up reel. In FIG. 4 a source clock 36 produces an output designated CLKA which is a series of short duration pulses occurring at regular intervals timed to define the commencement of a series of uniform bit cells. The rising edge of Clock A defines the beginning of each bit cell. The output of the clock 36 is applied through an inverter 38 to the toggle inputs of an Input Data Register 40 comprising flip-flops IDR3, IDR2, and IDR1. The data to be recorded is supplied from a data source (not shown). The data to be encoded is the same as that used in FIG. 1 and is shown in FIG. 5 in an NRZ format. The data appears at the D input of IDR3 and is shifted to the Q output thereof on the rising edge of $\overline{\text{CLKA}}$. The Q output of IDR3 is connected to the D input of IDR2. The Q output of IDR2 is applied to the D input of IDR2 through an AND gate 42. Input data register gating generally designated 43 includes AND gates 44 and 46. The Q output of IDR1 and the Q output of IDR2 are applied as inputs to the AND gate 44 the output of which is designated 11 DETECT and is applied as the other input to the AND gate 42 through the inverter 48. The Q output of the IDR1 and the $\overline{\text{Q}}$ output of the IDR2 are applied as inputs to the AND gate 46 along with the CLKA input from the clock 36. The output of the gate 46 is designated 10 DETECT. The output of the gate 44 will go high when IDR1 and IDR2 each store a 1 at their Q outputs. When this occurs the AND gate 42 will be disabled so that the next toggle input to IDR1 will produce a 0 at its Q output. The output of the gate 46 will go high when a 1 appears at the Q output of IDR1 and a 0 appears at the Q output of IDR2. The outputs of the gates 44 and 46 are OR'ed in the output data transition control gate 50. The gate 50 is connected with the toggle input of a flip-flop 52 forming a coded output data generator. The flip-flop 52 has its D input connected with its $\overline{\text{Q}}$ output and its Q output provides the bilevel coded output signal designated COD.

FIG. 5 shows somewhat idealized waveforms produced by the encoder of FIG. 4. When the first two bits are shifted into IDR2 and IDR1 both outputs will be high driving 11 DETECT high, toggling the flip-flops 52 to cause a transition at the beginning of the first bit cell (BCO1) of the coded output signal (COD) and inhibiting the gate 42 during BCO2. Accordingly, when the third bit which is a 0 is shifted into IDR2 the Q output of IDR1 is a 0 rather than a 1 thereby preventing the second bit which is already been encoded by the transition which occurred at the beginning of the first bit cell, from being encoded a second time. Thus, the action of the gate 42 has the effect of inhibiting the gates 44 and 46 during the bit cell following the bit cell in which a transition has occurred. For example, the gate 42 prevents the gate 46 from seeing the 10 bit configuration in bit cells 2 and 3 following detection of the pair of 1's in bit cells 1 and 2. Similarly, the gate 42 prevents the gate 44 from seeing the pair of 1's formed by bits 5 and 6 following the discrete pair of 1's represented by bits 4 and 5. The output of the gate 44 is driven high at the beginning of bit cells 1, 4, 5, 13, 18, and 24 and the gate 46 is driven high at the middle of bit times 9, 11, 15, and 21 which toggle the flip-flop 52 to produce the bilevel output signal COD shown in FIG. 5.

Figure 6:
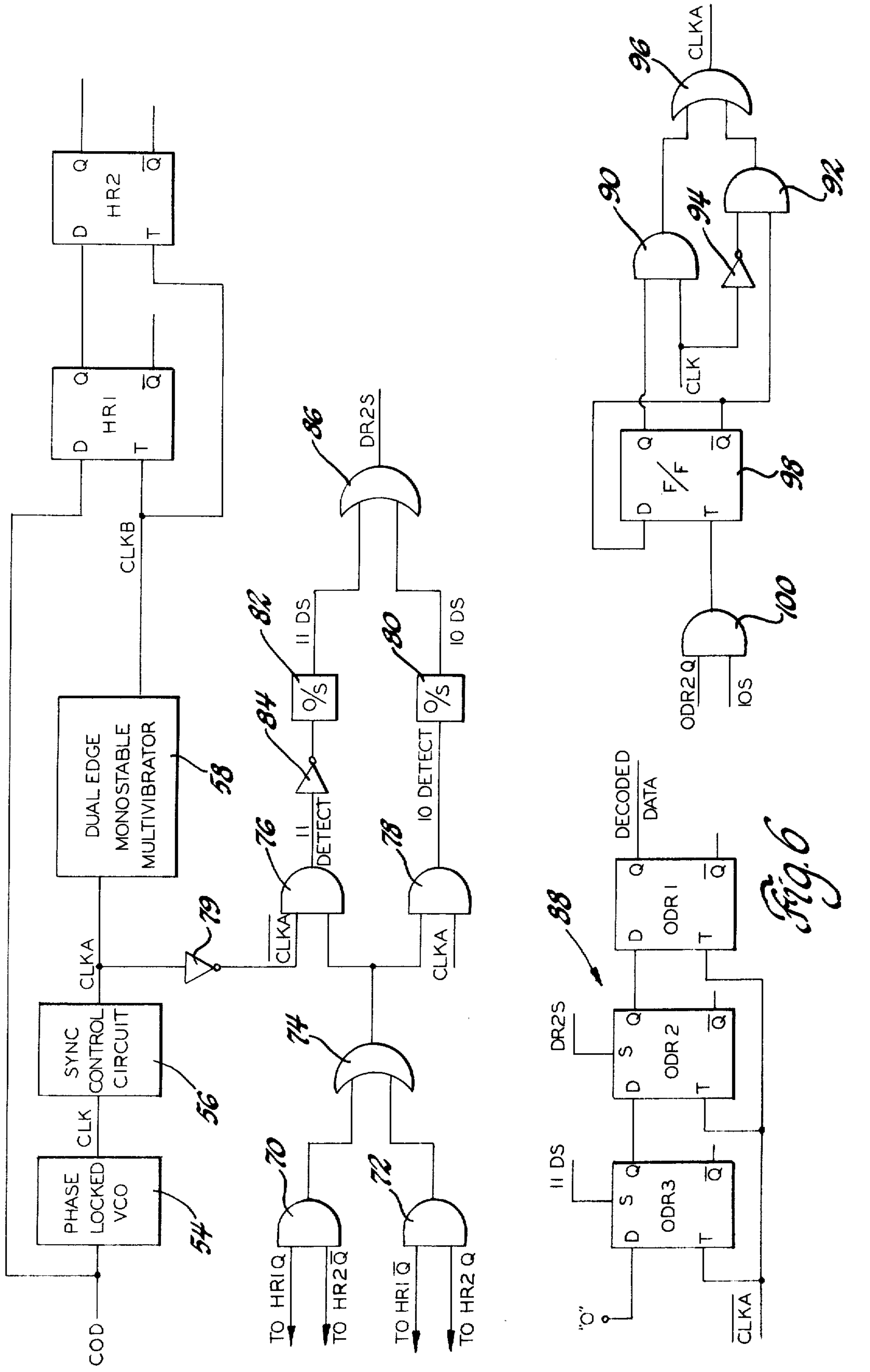
FIG. 6 is a logic diagram of a decoder for decoding the data encoded in accordance with the FIG. 4 circuitry.
Figures 7, 7A:
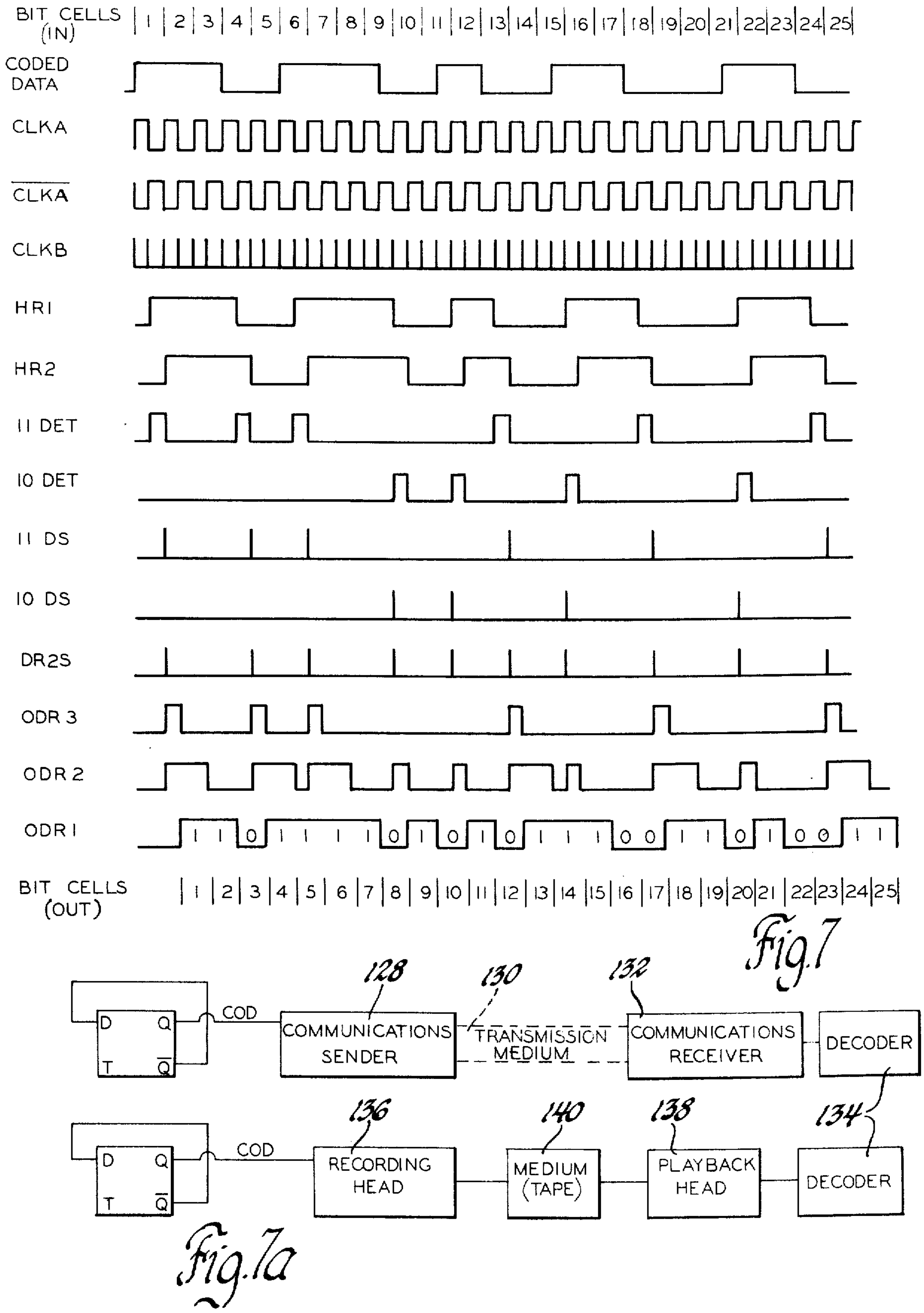
FIG. 7 is a waveform diagram showing somewhat idealized timing and data signals present in the operation of the circuitry of FIG. 6.
FIG. 7a is a block diagram incorporating the encoder and decoder of the present invention in recording and transmitting apparatus.

Referring now to FIG. 6, a preferred embodiment of a decoder for decoding the data encoded in accordance with the circuitry of FIG. 4 is shown. FIG. 7 shows somewhat idealized waveforms of the decoder of FIG. 6 for decoding the data previously encoded and represented by the waveforms of FIG. 5. The decoder includes a phase locked VCO54 which receives the coded data and produces a bit rate frequency clock signal which is fed to a synchronizing control circuit 56. The circuits 54 and 56 may be a conventional circuit for establishing bit rate, word and phase synchronization as is well known to those skilled in the art. The circuit 56 reproduces the CLKA waveform of FIG. 5 and insures that the CLKA waveform has a rising edge at the beginning of each bit cell. The rising and falling edge of CLKA triggers a dual edge monostable multivibrator 58 to produce the waveform CLKB which toggles flip-flops HR1 and HR2 at the beginning and middle of each bit cell. The coded data is applied to the D input of the HR1 and the Q output of HR1 is applied to the D input of HR2.

Thus, the coded data appears at the Q output of HR2 is delayed by one-half bit cell in relation to the coded data appearing at the Q output of HR1 as shown in FIG. 7. The Q output of HR1 and the $\overline{\text{Q}}$ output of HR2 provide inputs to an AND gate 70 while the $\overline{\text{Q}}$ output of HR1 and the Q output of HR2 provide inputs to an AND gate 72. The outputs of the gates 70 and 72 provide inputs to an OR gate 74 the output of which is applied as one input to a pair of AND gates 76 and 78 the other inputs of which are $\overline{\text{CLKA}}$ obtained through inverter 79 and CLKA respectively. Each time the coded data changes states the Q output of HR1 and HR2 will be in opposite states and, accordingly, one of the gates 70 or 72 will be enabled to thereby enable both of the gates 76 and 78 through the OR gate 74. The leading edge of the $\overline{\text{CLKA}}$ signal establishes the beginning of bit cell time while the leading edge of CLKA signal establishes the middle of bit cell time of the decoded output signal. Thus, if a transition occurs at the beginning of a bit cell indicative of the two bit configuration 11 having been encoded a $\overline{CLKA}$ pulse passes through the gate 76 as identified by the 11 DETECT waveform in FIG. 7. On the other hand, if a transition occurs at the middle of a bit cell indicative of the encoding of the two bit configuration 10 a CLKA pulse passes through the gate 78 as shown in the waveform designated 10 DETECT in FIG. 7. The output of the gate 78 toggles a one-shot 80 the output of which is designated 10 DS which produces a spike at the leading edge of the 10 DETECT signal. The output of the gate 78 toggles a one-shot 80 the output of which is designated 10 DS which produces a spike at the leading edge of the 10 DETECT signal. The output of the gate 76 is applied to a one-shot 82 through an inverter 84 to produce the output designated 11 DS which contains a spike at the trailing edge of the 11 DETECT pulses. The outputs of the one-shots 80 and 82 are inputs to an OR gate 86 the output of which is designated DR2S.

An Output Data Register 88 comprises flip-flops designated ODR3, ODR2, and ODR1 which are toggled by $\overline{CLKA}$. The D input of ODR3 is tied to a logic 0. The set input of ODR3 is connected with the one-shot 82 while the set input of ODR2 is connected with the output of the OR gate 86. Each time a transition in the coded data occurs a 11 DS spike or a 10 DS spike will be generated depending upon the time of occurrence of the transition. If the transition occurs at the beginning of a bit cell the 11 DS spike is generated which sets ODR3. The 11 DS spike also produces a DR2S spike which sets ODR2. On the other hand, if a 10 DS is produced, only ODR2 is set by the resulting DR2S spike and on the following rising edge of $\overline{CLKA}$ a 1 is shifted into ODR1 and a 0 is shifted into the ODR2. The decoded data thus appears at the Q output of ODR1 as shown in the waveform of FIG. 7 which is identical to the source data waveform shown in FIG. 5.

The phase synchronizing portion of the synchronization control circuit 56 would normally include a pair of AND gates 90 and 92. The CLK output of the VCO54 is applied as one input to the AND gate 90 while the CLK signal is inverted by an inverter 94 and applied as one input to the AND gate 92. The output of the gates 90 and 92 provide inputs to an OR gate 96 which provides the CLKA or One of the other of the AND gates 90 and 92 is enabled by a flip-flop 98 depending on the state of the flip-flop. Normally, a code word is supplied with the coded data which permits observation of the decoded data to determine whether the code word is present and if not present this would be an indication that the CLKA signal was out of phase. In that event the flip-flop 98 would be toggled to enable the other one of the AND gates 90 and 92 to place the CLKA signal in proper phase. However, the present invention permits the phase of CLKA to be automatically synchronized with the coded data by observing the time of transition of the pair of transitions separated by 1½ bit cells. If CLKA is in the proper phase then the first of the pair of transitions will occur at the middle of a bit cell and the second of the pair of transitions will occur at the beginning of a bit cell 1½ bit cells displaced from the first transition. On the other hand, if CLKA is out of phase then the first of the pair of transitions separated by 1½ bit cells will occur at the beginning of a bit cell and the second of the pair of transitions will occur at the middle of the next succeeding bit cell. Thus, if CLKA is out of phase the first of the pair of transitions will produce a 11 DS spike setting ODR3 and ODR2. In the middle of the next bit cell while ODR2Q is high a 10 DS spike will be produced by the second of the pair of transitions. By AND'ing these two signals in an AND gate 100 and toggling the flip-flop 98 from the output of the gate 100 the proper phase for CLKA can be quickly established.

Figure 8:
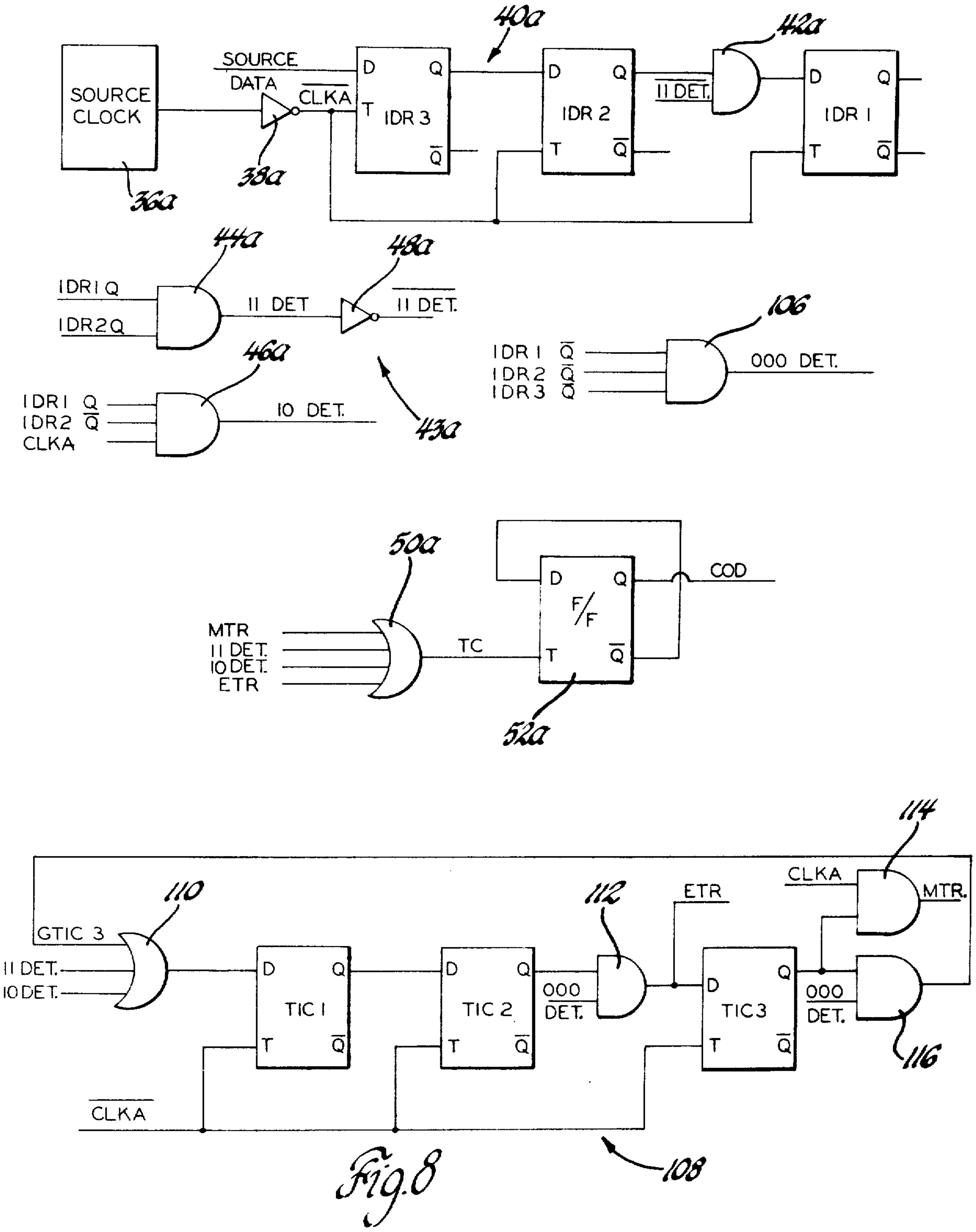
FIG. 8 is a logic diagram of another embodiment of the encoder of the present invention.

Referring now to FIG. 8, a modification of the circuit shown in FIG. 4 is provided for incorporation of a unique transitional sequence for raising the lowest frequency content of the encoded data signal. The transition sequence is incorporated in the coded waveform where a string of three or more consecutive 0's follow the bit pairs 11 or 10 in the source data. In accordance with FIG. 4, these 0's would normally not produce any transitions. The transition sequence is unique since it comprises a first transition at the leading edge of a bit cell and a second transition at the middle of the following bit cell. This pattern maintains the minimum 1½ bit cell separations between transitions but is distinguishable from the 1½ bit cell separations which may occur from the coding of the real data pattern of 1011 since in the real data situation the first transition occurs at the middle of the bit cell containing the first 1 and the second transition occurs at the leading edge of the bit cell containing the second 1. Thus, the unique transition sequence is distinguishable on the basis of time of occurrence of the two transitions and also the fact that the two transitions occur in adjacent bit cells.

Elements of the FIG. 8 circuit corresponding to those of the FIG. 4 circuit are designated by the subscript *a*. The input data register gating 43*a* in addition to the gates 44*a* and 46*a* include an AND gate 106 having inputs connected with the $\overline{Q}$ outputs of IDR1, IDR2, and IDR3 so that the output of the gate 106, designated 000 DETECT is driven high when three 0's are stored in the input data register 40*a*. The output data transition control gate 58 includes additional inputs designated MTR (mid-transition required) and ETR (edge transition required) which are obtained from a transition interval counter 108 comprising flip-flops TIC1, TIC2, and TIC3 which are toggled from $\overline{CLKA}$. The counter 108 counts bit time intervals following all output data transitions. To this end the D output of TIC1 is connected with 11 DETECT and 10 DETECT through an OR gate 110. The Q output of TIC1 is connected with the D input of TIC2 and the Q output of TIC2 is connected with the D input of TIC3 through an AND gate 112. The gate 112 AND's the Q output of TIC2 with 000 DETECT to produce the ETR signal. The Q output of TIC3 is AND'ed with CLKA in AND gate 114 to produce the MTR signal. The Q output of TIC3 is also fed back to the D output of TIC1 through an AND gate 116 and the OR gate 110. The ETR signal is driven high at the leading edge or beginning of a bit cell by CLKA whenever three bit cells following a pair of bit cells containing the bit pairs 11 or 10 contain 0's, thereby toggling the flip-flop 52*a* through the gate 50*a* at the beginning of the first of the three bit cells. One bit cell later the Q output of TIC3 is driven high and at the middle of that bit cell MTR is driven high by CLKA to toggle the flip-flop 52*a* through the gate 50*a* at the middle of the second of the three bit cells. If at the time TIC3 is toggled a 0 is fed into IDR3 so that 000 DETECT remains high, the D input to TIC1 is driven high through gates 114 and 110 so that the counter 108 will continue to produce pairs of transitions in the output waveform at 1½ bit time intervals with the first of the pair of transitions occurring at the edge of a bit cell and the second of the pair of transitions occurring at the middle of the next bit cell so long as there are three 0's in the register 40*a*. It should be noted that unless there is a three bit cell interval containing 0's an edge transition will not be produced. But once an edge transition is produced a mid-cell transition will always follow. Thus, the unique transitional pattern contains transitions separated by 1½ cells and always begins with an edge transition and ends with a mid-cell transition.

Figure 9:
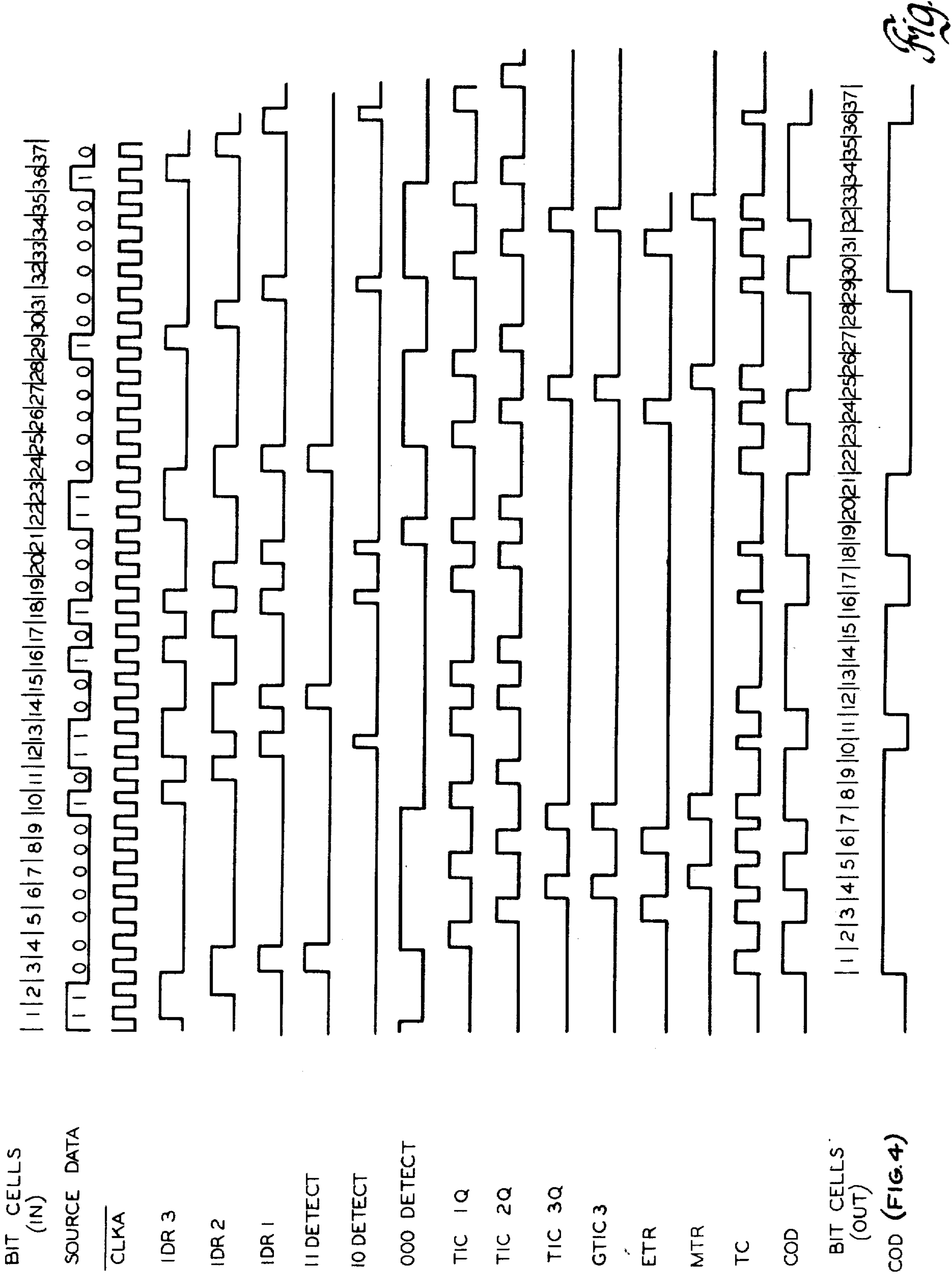
FIG. 9 is a waveform diagram showing somewhat idealized timing and data signals present in the operation of the circuitry of FIG. 8.

Somewhat idealized waveforms for the encoder of FIG. 8 are shown in FIG. 9 for the encoding of 37 bits of source data. 11 DETECT pulses are shown to occur in phase with CLKA where IDR1Q and IDR2Q are both high and 10 DETECT pulses are shown to occur in phase with CLKA where IDR1Q is high and IDR2Q is low in the same fashion as those waveforms were generated in the FIG. 4 embodiment. For comparison purposes the coded output waveform which would result from coding the data shown in accordance with the FIG. 4 embodiment is shown in the waveform designated COD (FIG. 4). The FIG. 4 embodiment would produce transition at the beginning of bit cells 1, 12, and 22 and at the middle of bit cells, 10, 16, 18, 29, and 36. The minimum separation between transitions is 1½ bit cells as defined by the transition at the middle of bit cell 10 and the beginning of bit cell 12. The maximum interval between transitions is, of course, dependent on the length of the string of 0's as is the case when coding in accordance with the NRZ format. For the data shown, the maximum interval is 10½ bit cells. It is the purpose of the FIG. 8 embodiment to limit this maximum interval to 4½ bit cells thereby raising the lowest frequency content of the coded data.

Continuing with the waveforms generated by the FIG. 8 embodiment, the coded output data waveform is designated COD and contains the transitions which would have been generated by the FIG. 4 embodiment and in addition, contains the unique transitional pattern which is generated when at least three 0's are detected following a bit cell in which no transition occurs. At the beginning of bit cell 1 (BCO1) of the coded output data a 11 DETECT pulse occurs producing a transition and at the beginning of BCO2, TIC1Q is driven high. At the beginning of BCO3, TIC2Q is driven high and since the 000 DETECT is high ETR is driven high producing a transition at the beginning of BCO3. At the beginning of BCO4, TIC3Q is driven high and at the middle of BCO4, CLKA drives MTR high to produce a transition at the middle of BCO4. Since 000 DETECT is still high at the beginning of BCO5, TIC1Q is driven high. At the beginning of BCO6, TIC2Q is driven high and since the 000 DETECT is still high ETR is driven high producing a transition at the beginning of BCO6. At the beginning of BCO7, TIC3Q is driven high so that at the middle of BCO7, CLKA drives MTR high to produce a transition at the middle of BCO7. Since 000 DETECT is high at the beginning of BCO7, TIC1Q is driven high at the beginning of BCO8 and TIC2Q is driven high at the beginning of BCO9. However, at the beginning of BCO9, 000 DETECT is low and, accordingly, ETR remains low. The transition in COD occurring at the beginning of BCO12 and BCO22 are a result of the 11 DETECT pulses. The transitions at the middle of BCO10, BCO16, BCO19, BCO29, and BCO36 result from the 10 DETECT pulses. The unique transitional pattern is inserted at the beginning of BCO24 and the middle of BCO25 since BCI24, BCI25, and BCI26 all contain 0's and BCO23 does not contain a transition. Similarly, the transitional pattern is inserted again at the beginning of BCO31 in the middle of BCO32. It will be noted that the 000 DETECT signal is driven high at the middle of bit cell 4 of the input source data (BCI4). This results from the fact that detection of the pair of 1's at the middle of BCI13 causes a 0 to be shifted into IDR1 at the middle of BCI4. It will also be noted that 000 DETECT is driven high for at the middle of BCI21 as a result of the 0's in BCI19, BCI20, and BCI21. However, a transition occurred at the middle of BCO18 and, accordingly, these three 0's do not produce the unique transition pattern.

Figure 10:
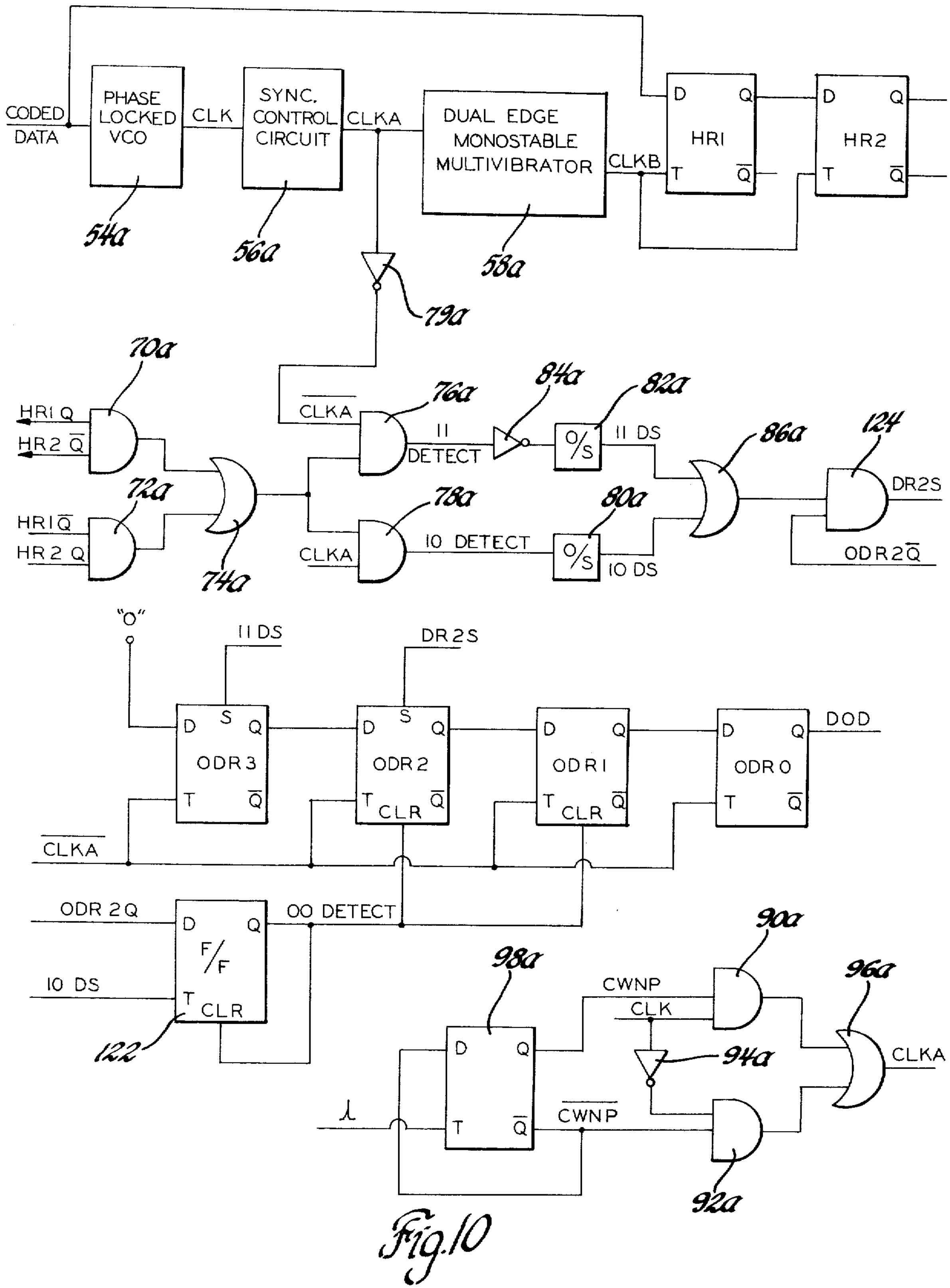
FIG. 10 is a logic diagram of a decoder for decoding the data encoded in accordance with the FIG. 9 circuitry.
Figure 11:
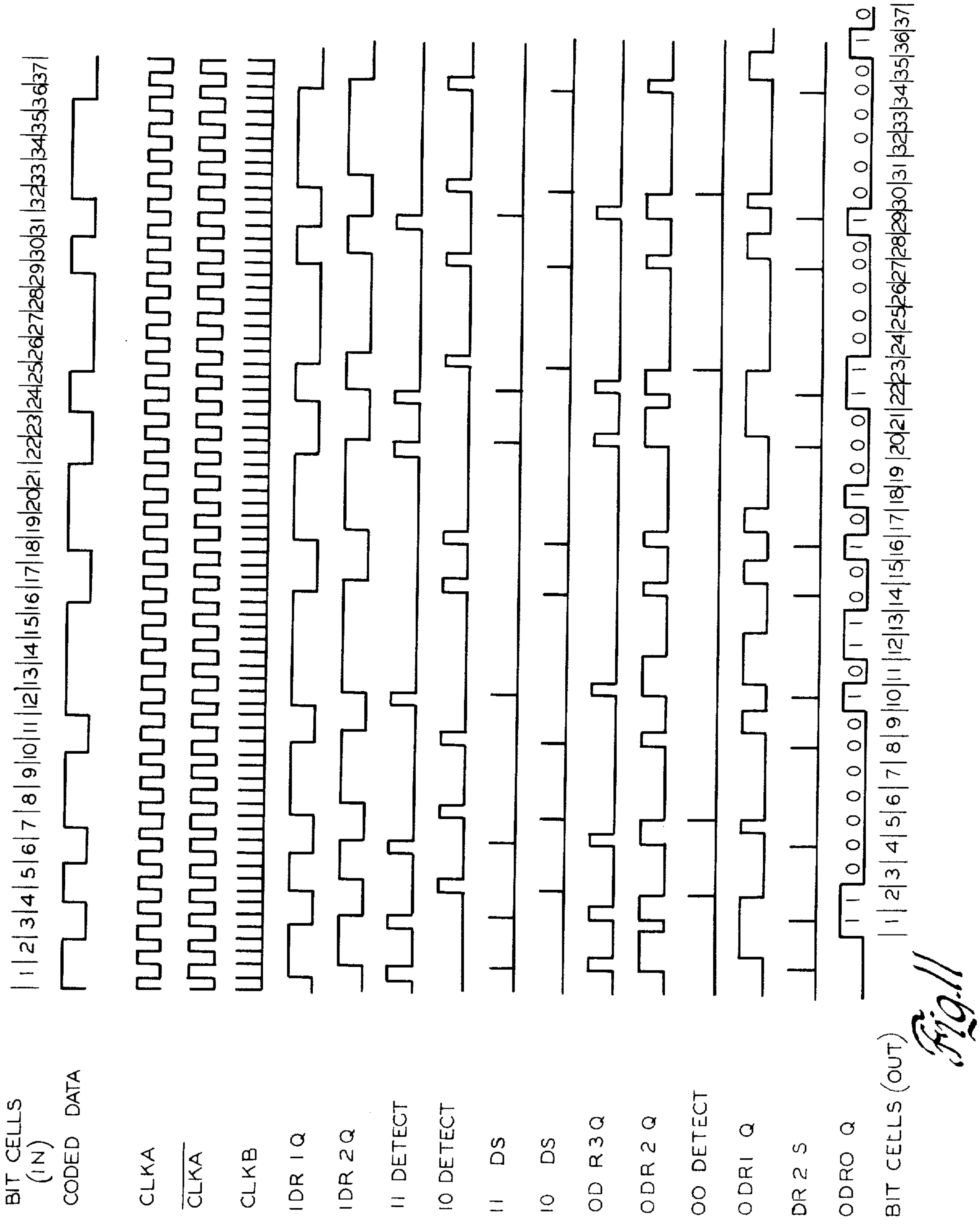
FIG. 11 is a waveform diagram showing somewhat idealized timing and data signals present in the operation of the circuitry of FIG. 10.

Referring now to FIG. 10, circuitry for decoding the data encoded by the circuit of FIG. 8 is shown. FIG. 10 is quite similar to the decoder shown in FIG. 6 and corresponding components are designated by the subscript *a*. In FIG. 10, the output data register includes an additional flip-flop designated ODRO having its D input connected with the Q output of ODR1. The decoded output data (DOD) is obtained from the Q output of ODRO. The clear inputs to ODR1 and ODR2 are connected with the Q output of a flip-flop 122 having its D input connected to the Q output of ODR2Q and its toggle input connected with the 10 DS signal. In FIG. 10, the output of the OR gate 86*a*, rather than being tied directly to the set input of the flip-flop ODR2 as in FIG. 6, is applied to the set input of ODR2 through an AND gate 124, the other input of which is $ODR2\bar{Q}$. As previously indicated, the unique flag or transitional pattern which is introduced into the waveform consists of a transition at the beginning of a bit cell followed by a transition at the middle of the next bit cell. This waveform cannot occur during the normal encoding of data. Consequently, if a transition occurs at the beginning of a bit cell and is followed by a transition in the middle of the next bit cell these transitions obviously do not represent bit pairs. Accordingly, the gate 124 is inhibited during the bit cell following a bit cell in which a transition has occured at the leading edge thereof by the fact that ODRQ2 will be high. Consequently, the AND gate 124 prohibits those transitions of the unique transitional pattern which occurs at the middle of a bit cell from being interpreted as representing a pair of bits. Furthermore, since the transition at the beginning of a bit cell preceding a transition at the middle of the following bit cell is also a forced transition and does not represent a bit pair, the two 1's set into ODR3 and ODR2 as a result of the 11 DETECT pulse produced thereby must be cleared. These two 1's are cleared by the flip-flop 122 on the succeeding mid-bit cell transition which toggles the flip-flop 122 while the pair of 1's are in ODR2 and ODR1. Thus, with reference to FIG. 11, the transition at the beginning of BC13 produces a 11 DETECT pulse and a 11 DS spike which sets ODR3 and ODR2. However, the 10 DS spike resulting from the transition at the middle of BC14 is inhibited from setting ODR2 by the gate 124 and instead toggles the flip-flop 122 clearing ODR2 and ODR1. Similarly, the 11 DS spike produced by the transition at the beginning of BC16 and the 10 DS spike produced by the transition occurring at the middle of BC17 results in 0's being clocked into ODRO. This operation also takes place with regard to the transitions occurring at the beginning of BCI24 and the middle of BCI25, and at the beginning of BCI31 and the middle of BCI32. Consequently, the decoder of FIG. 10 effectively disregards those transitions occurring in the coded waveform which do not identify bit pairs and produces the true data in accordance with the waveform designated COD (FIG. 4) in FIG. 9, i.e. the transitions occurring in the coded signal at the beginning of bit cells 1, 12, and 22 produce a binary 1 in such bit cells and in the following bit cell and the transitions in the coded signal occurring at the middle of bit cells 10, 16, 18, 29, and 36 produce a binary 1 in such bit cells and a binary 0 in the following bit cell. Binary 0's are produced in the remaining bit cells. Since the unique flag consisting of a transition at the leading edge of a bit cell followed by a transition at the midpoint on the following bit cell is utilized for raising the lowest frequency content of the encoded data. This unique condition cannot be used for establishing phase synchronization as was the case of the FIG. 6 decoder. Accordingly, the flip-flop 98*a* of the control circuit 56*a* is toggled if necessary to establish the proper phase synchronization in the conventional fashion, i.e., by observing the decoded data to ascertain whether a code word, which is normally provided to establish synchronization, is or is not present.

As previously indicated, the encoder and decoder of the present invention may be employed in a variety of communication systems such as PCM telemetry systems, wire communication modems, and in various recording systems. As shown in FIG. 7*a*, the output of the encoder is applied to a communication sender 128 for transmission over a suitable transmission medium 130 to a communication receiver 132 where the data is decoded by the decoder 134 of the present invention. Also, the coded output data may be applied to a conventional recorder system including a recording head 136 and playback head 138. The data may be recorded on a variety of recording media including type, drum, or disk as indicated at 140.

Having thus described my invention what I claim is:

1. Apparatus for encoding binary data comprising:

clock means for forming a plurality of bit cells of substantially uniform time durations and for indentifying the boundaries of and middle of each bit cell, logic means responsive to the state of two adjacent bits of said binary data and to said clock means for providing a bistable output signal containing transitions between the separately identifiable states of said output signal at one of the boundaries or at the middle of a selected one of the two bit cells containing said adjacent bits to identify the state of the two adjacent bits of data, said logic means responding to a first pair of adjacent bits forming one of the four possible two bit configurations by producing a transition at said one of the boundaries of said selected one of the bit cells unless said selected bit cell is preceded by a bit cell containing a transition at the middle or at said one of the boundaries thereof, said logic means responding to a second pair of adjacent bits forming a second of the four possible two bit configurations, the second bit of which is the complement of the second bit of said first pair of adjacent bits by producing a transition at the middle of said selected bit cell unless said selected bit cell is preceded by a bit cell containing a transition at the middle or at one of said boundaries thereof whereby each transition encodes two bits of data and successive transitions are separated by at least 1½ bit cells.

2. The apparatus defined in claim 1 wherein said selectaed one of the bit cells containing said adjacent bits is the bit cell containing the first of the two adjacent bits and said one of the boundaries is the beginning of the bit cell containing the first of the two adjacent bits.

3. The apparatus defined in claim 2 wherein said one of the four possible two bit configurations is 11 and the second of the four possible two bit configuration is 00.

4. The apparatus defined in claim 2 wherein said one of said four possible two bit configurations is 11 and wherein said second of the four possible two bit configurations is 10.

5. The apparatus defined in claim 2 wherein said one of said four possible two bit configurations is 01 and wherein said second of the four possible two bit configurations is 10.

6. The apparatus defined in claim 2 wherein said one of said four possible two bit configurations is 00 and wherein said second of the four possible two bit configurations is 01.

7. Apparatus for encoding binary data for communication on a medium supporting two separately identifiable states comprising:

clock means for forming a plurality of bit cells of substantially uniform time durations and for identifying the beginning and middle of each bit cell, logic means responsive to said binary data and to said clock means to provide an output on said medium such that one bit of binary information is communicated in each of said bit cells, said logic means responding to those bits of said binary data of one binary characterization which have not previously been encoded by providing a transition between said separately identifiable states at the leading edge or midpoint of each bit cell containing an uncoded bit of said one binary characterization depending upon whether the bit cell containing said uncoded bit as immediately followed by a bit cell containing a bit of said one binary characterization or the other binary characterization respectively, whereby each transition encodes two bits of data and successive transitions are separated by at least 1½ bit cells.

8. Apparatus for encoding binary data comprising:

input data register means including at least first and second bistable storage elements, first AND gate means having its output connected to the input of the second element and one input connected to the output of said first element, clock means for shifting said data through said register means at a predetermined bit rate, bilevel output signal generating means, second AND gate means responsive to the entry of a bit of one binary character into each of said elements for triggering said bilevel output signal generating means, and for inhibiting said first AND gate means, third AND gate means responsive to the entry of a bit of one binary character in said second element and a bit of the other binary character in said first element for triggering said bilevel output signal generating means one-half bit cell delayed in time relative to the time of triggering by said second AND gate means.

9. Apparatus for encoding binary data for communication on a medium supporting two separately identifiable states and for subsequently reproducing the binary data comprising:

clock means for forming a plurality of bit cells of substantially uniform time durations and for identifying the beginning and middle of the bit cell, logic means responsive to said binary data and to said clock means to provide an output on said medium such that one bit of binary information is communicated in each of said bit cells, said logic means responding to those uncoded bits of binary data of one binary characterization by providing a transition between said separately identifiable states at the beginning or midpoint of each bit cell containing an uncoded bit of said one binary characterization depending upon whether the bit cell containing an uncoded bit is immediately followed by a bit cell containing a bit of said one binary characterization or the other binary characterization respectively, whereby each transition encodes two bits of data and successive transitions are separated by at least 1½ bit cells, decoder logic means responsive to said transitions for registering said one binary characterization in each bit cell containing a transition and registering said one or said other binary characterization in the following bit cell depending upon whether the transition in the preceding bit cell occurs at the beginning or midpoint of said preceding bit cell, said decoder logic means registering said other binary characterization in each of the remaining bit cells.

10. Apparatus for encoding binary data comprising:

clock means for establishing the beginning and the middle of each bit cell containing said binary data, logic means responsive to said binary data and to said clock means for providing a coded bistable output signal containing transitions between two separately identifiable states of said output signal at the beginning or middle of selected ones of the bit cells containing the bits of said data to thereby code both the binary character of the bit in the selected ones of the bit cells and the bit in the bit cell immediately following said selected bit cells, said logic means responding to those uncoded bits of said data of one binary characterization by providing a transition between said separately identifiable states at the beginning or middle of each bit cell containing an uncoded bit of said one binary characterization depending upon whether the bit cell containing the uncoded bit is immediately followed by a bit cell containing a bit of said one binary characterization of the other binary characterization respectively, whereby transitions between said separately identifiable states are separated by at least 1½ bit cells.

11. The apparatus defined in claim 10 further comprising decoder logic means responsive to said transitions for registering said one binary characterization in each bit cell containing a transition and registering said one or said other binary characterization in the following bit cell depending upon whether the transition in the preceding bit cell occurs at respectively the beginning or middle or said preceding bit cell, said decoder logic means registering said other binary characterization in each of the remaining bit cells.

12. Apparatus for encoding binary data comprising:

clock means for establishing the beginning and the middle of each bit cell containing said binary data, logic means responsive to said binary data and to said clock means for providing a coded bistable output signal containing transitions between two separately identifiable states of said output signal at the beginning or middle of selected ones of the bit cells containing the bits of said data to thereby code both the binary character of the bit in the selected one of the bit cells and the bit in the bit cell immediately following said selected bit cells, said logic means responding to those uncoded bits of, said data of one binary characterization by providing a transition between said separately identifiable states at the beginning or middle of each bit cell containing an uncoded bit of said one binary characterization depending upon whether the bit cell containing an uncoded bit is immediately followed by a bit cell containing a bit of said one binary characterization or the other binary characterization respectively, whereby transitions between said separately identifiable states are separated by at least 1½ bit cells, additional logic means responsive to three consecutive bits of uncoded data of said other binary characterization by providing a transition at the beginning of the bit cell containing the first of said three consecutive bits and at the middle of the bit cell containing the second of the three consecutive bits to thereby code said three consecutive bits whereby the maximum interval between transitions is 4½ bit cells.

13. Apparatus for encoding binary data comprising:

clock means for establishing the beginning and the middle of each bit cell containing said binary data, logic means responsive to said binary data and to said clock means for providing a coded bistable output signal containing transitions between two separately identifiable states of said output signal at the beginning or middle of selected ones of the bit cells containing the bits of said data to thereby code both the binary character of the bit in the selected one of the bit cells and the bit in the bit cell immediately following said selected bit cells, said logic means responding to those uncoded bits of said data of said one binary characterization by providing a transition between said separately identifiable states at the beginning or middle of each bit cell containing an uncoded bit of said one binary characterization depending upon whether the bit cell containing the uncoded bit is immediately followed by a bit cell containing a bit of said one binary characterization or the binary characterization respectively, whereby transitions between said separately identifiable states are separated by at least 1½ bit cells, additional logic means responsive to three consecutive bits of uncoded data of said other binary characterization by providing a transition at the beginning of the bit cell containing the first of said three consecutive bits and at the middle of the bit cell containing the second of the three consecutive bits to thereby code said three consecutive bits whereby the maximum interval between transitions is 4½ bit cells, decoder logic means comprising an output data register including at least first, second, third, and fourth stages, means for entering bits of said other binary characterization into said first stage and for shifting said register at the beginning of each bit cell, first logic means for setting the first and second stages of said register to said one binary characterization in response to a transition at the beginning of a bit cell, second logic means for setting the second stage of said register to said one binary characterization in response to a transition at the middle of a bit cell unless the transition at the middle of a bit cell is preceded by a transition at the beginning of the previous bit cell, third logic means responsive to a transition at the middle of a bit cell which is preceded by a transition at the beginning of the previous bit cell for clearing said second and third stages of said register, whereby said binary data appears at the output of the fourth stage of said register means.

14. A method of encoding binary information on a communication medium supporting two separately identifiable states and being considered to be arbitrarily divided into a plurality of substantially uniform bit cells comprising:

producing a transition between the separately identifiable states at the beginning of the first of two successive bit cells to represent that the two bit cells contain a first of the four possible two bit configurations, producing a transition between the separately identifiable states at the midpoint of the first of two successive bit cells to represent that the two bit cells contain a second of the four possible two bit configurations, the second bit of which is the complement of the second bit of said first of said four possible two bit configurations.

15. A method of recoding binary 1's and 0's on a magnetic medium and thereafter detecting the 1's and 0's from the medium, the medium exhibiting two separately identifiable states and being considered to be arbitrarily divided into a plurality of nearly uniform bit cells, comprising the steps of:

producing a flux transition between the separately identifiable states at the beginning of the first of two successive bit cells to represent that each of the two bit cells contains a 1, producing a flux transition between the separately identifiable states at the midpoint of the first of two successive bit cells to represent that the first of the two successive bit cells contains a 1 and the second of the two successive bit cells contains a 0, detecting those bit cells which have a flux transition and identifying the detected bit cell as representing a 1, identifying the bit cells following a bit cell having a flux transition as representing a 1 or a 0 depending upon whether the transition in the previous bit cell occurred at the beginning or middle respectively, of the bit cell, identifying any remaining bit cells as representing a 0. succession characterization interval, and for identifying the remaining bit cell intervals as

16. In combination, means for communicating one or the other of two different characterizations of binary information within selected ones of a successino of arbitrarily defined bit cell intervals by producing a signal indicium at respectively, the beginning or midpoint of selected ones of the bit cell intervals and means for detecting the binary information communicated comprising means responsive to those bit cell intervals having a signal indicium for identifying each such bit cell interval as representing one binary characterizationi and for identifying the following bit cell interval as representing said one binary characterization or the other binary characterization depending upon whether said signal indicium occurred at the beginning or midpoint of the previous bit cell intervals as representing said other binary characterization.

17. In a system in which one of two different characterizations of binary information is communicated within selected ones of a succession of arbitrarily defined bit cell intervals by producing a signal indicium at the beginning or midpoint of selected ones of the bit cell intervals, apparatus for detecting the binary information communicated comprising:

first logic means comprising an output data register including at least first, second, and third stages, means for entering bits of said other binary characterization into said first stage and for shifting said register at each bit cell interval, second logic means for setting the first and second stages of said register to said one binary characterization in response to the occurrence of said signal indicium at the beginning of a bit cell interval, third logic means for setting the second stage of said register to said one binary characterization in response to the occurrence of said signal indicium at the midpoint of a bit cell interval.

18. Apparatus for coding a non-return-to-zero input bit stream comprising:

clock means generating a first timing pulse train of pulses occurring at substantially the beginning of an established bit cell time and a second timing pulse train of pulses occurring at substantially the middle of the established bit cell time;

storage means for simultaneously storing at least two adjacent bits in said input bit stream;

first AND function performing logic means enabled by one of said timing pulse trains and connected with said storage means for detecting discrete pairs of adjacent like bits in said bit stream and for generating a single logic level transition when the like bits are 11 and no transition has occurred during the previous bit cell time;

second AND function performing means enabled by the other of said timing pulse trains and connected with said storage means for detecting discrete pairs of adjacent like bits in said bit stream and for generating a single logic level transition when the like bits are 00 and no transition has occurred during the previous bit cell time; and means actuated by the logic level transitions of either of said AND function performing means for generating a coded bit stream containing transitions for each discrete pair of like bits in said input bit stream, whereby successive transitions in said coded bit stream are separated by at least 1½ bit cell times.

19. Apparatus for coding a non-return-to-zero input bit stream comprising:

means generating a first timing pulse train of pulses occurring substantially at the beginning of bit cell time and a second timing pulse train of pulses occurring at substantially the middle of bit cell time;

storage means for storing two bits in said input bit stream;

first AND function performing logic means enabled by said first timing pulse train for sensing the two bits stored in said storage means and for generating a logic level transition when said two bits are logic 1's;

second AND function performing logic means enabled by said second timing pulse train for sensing the two bits stored in said storage means and for generating a logic level transition when said two bits are logic 0's;

OR function performing logic means responsive to the outputs of said first and second AND function performing logic means;

a flip-flop responsive to the output of said OR function performing logic means;

means responsive to the output of said OR function performing logic means for disabling said first and second AND function performing logic means for one bit cell time following either of said logic level transitions;

whereby the output of said flip-flop is a coded bit stream in which there is a transition at substantially the beginning of bit cell time to represent discrete pairs of 1's in said input bit stream and a transition at substantially the middle of bit cell time to represent discrete pairs of 0's in said input bit stream and successive ones of said transitions are separated by at least 1½ bit cell times.

20. Apparatus utilizing a non-return-to-zero input bit stream, a first timing pulse train of pulses for establishing the beginning of bit cell time of a coded output bit stream and a second timing pulse train of pulses for establishing the middle of bit cell time of a coded output bit stream comprising:

means for storing two bits in said input bit stream;

switch means;

means responsive to said first timing pulse train and the logic levels of said two bits for applying a trigger pulse to said switch means;

means responsive to said second timing pulse train and the complement of the logic level of said two bits for applying a trigger pulse to said switch means;

whereby a transition occurs in the output level of said switch means at the beginning of bit cell time when said two bits are at predefined logic levels and a transition occurs in the output level of said switch means at the middle of bit cell time when said two bits are the complement of said predefined logic levels;

means for inhibiting said switch means for one bit cell time following a transition in the output level of said switch means whereby successive transitions are separated by at least 1½ bit cell times.

21. Apparatus utilizing a non-return-to-zero input bit stream, a first timing pulse train of pulses occurring at the beginning of bit cell time and a second timing pulse train of pulses occurring in the middle of bit cell time comprising:

means for storing two bits in said bit stream;

a flip-flop;

first logic means enabled by one of said timing pulse trains for sensing the logic levels of the two stored bits and for applying a clocking pulse to said flip-flop to switch the state of the flip-flop when the two bits stored are 1's;

second logic means enabled by the other of said timing pulse trains for sensing the logic levels of the two stored bits and for applying a clocking pulse to said flip-flop to switch the state of the flip-flop when the two bits stored are 0's; and means responsive to the output of said first and second logic means for disabling said first and second logic means for one bit cell time subsequent to a clock pulse from said first or second logic means whereby successive clocking pulses to said flip-flop are separated by at least 1½ bit cell times.

22. The apparatus defined in claim 21 wherein said one of said timing pulse trains is said first timing pulse train whereby a transition occurs in the output of said flip-flop at a time coinciding with the beginning of bit cell time when the two bits stored are 1's and a transition occurs in the output of the flip-flop in the middle of a bit cell time when the two bits stored are 0's.

23. Apparatus for converting an input bit stream the data content of which is contained in the level of the input bit stream to an output bit stream wherein the content of the data is contained in the time of state change relative to bit time, said apparatus comprising:

clock means synchronized with said input bit stream for generating a first clock pulse train at a predetermined frequency establishing bit time, and for generating second and third clock pulse trains at said predetermined frequency and phase displaced from each other and from said first clock pulse train;

storage means for storing at least two bits of said input bit stream during any one bit time, said clock means being coupled with said storage means for shifting said input bit stream through said storage means in response to said first clock pulse train;

first gate means controlled by said second clock pulse train and coupled to said storage means for detecting the level of said two bits stored therein and for developing a first control signal containing pulses representing the detection of pairs of 1's;

second gate means controlled by said third clock pulse train and coupled with said storage means for detecting the level of the said two bits stored in said storage means and for developing a second control signal containing pulses representing the detection of pairs of 0's;

third gate means coupled to the output of said first and second gate means for developing a third control signal containing pulses corresponding to each pulse in said first and second control signals;

means responsive to the detection of a pair of 1's or a pair of 0's for inhibiting for one bit time any subsequent detection of a pair of like bits in said storage means whereby consecutive pulses in said first and second control signals are separated by at least two bit cell times and consecutive pulses in said third control signals are separated by at least 1½ bit cell times;

and control means for changing the state of an output bit stream in response to a pulse in said third control signal.

24. Apparatus for encoding binary data comprising:

clocking means for forming a plurality of bit cells of substantially uniform time durations;

complementary bit pair detection means responsive to said binary data and to the clocking means for comparing the state of each bit of said data with the state of the succeeding bit of said data to produce first control pulses only upon detection of discrete pairs of adjacent bits of a predetermined bit pair configuration, whereby said first control pulses are separated one from the other by at least two bit cells and to produce second control pulses only upon detection of discrete pairs of adjacent bits which are the complement of said predetermined bit pair configuration whereby said second control pulses are separated one from the other by at least two bit cells;

controlled means responsive to said first and second control pulses for providing an output signal such that one bit of binary data is communicated in each of said bit cells, said controlled means varying a parameter of the output signal in a first uniquely identifiable manner in response to said first control pulses and varying the parameter of the output signal in a second uniquely identifiable manner in response to said second control pulses and maintaining the existing parameter of the output signal during the bit cells preceding and following the bit cells in which said first and second control pulses occur.

25. Apparatus for encoding binary information comprising:

clocking means for forming a plurality of bit cells of substantially uniform time durations; and signal generating means responsive to said binary information and to said clocking means to provide an output signal such that one bit of binary information is communicated in each of said bit cells, said signal generating means responding to those of said bits of one binary characterization by varying a parameter of said output signal in a first uniquely identifiable manner during only those of the corresponding bit cells which are immediately followed by a bit cell containing a bit of said one binary characterization and which are immediately preceded by a bit cell during which said parameter has not been varied, and responding to those of said bits of the other binary characterization by varying the parameter of said output signal in a second uniquely identifiable manner during only those of the corresponding bit cells which are immediately followed by a bit cell containing a bit of said other binary characterization and which are immediately preceded by a bit cell during which said parameter has not been varied.

26. Apparatus for encoding binary data;

clocking means for forming a plurality of bit cells of substantially uniform time durations; and logic means responsive to said binary data and to said clocking means to provide an output signal having two separately identifiable states, said logic means responding to pairs of adjacent bits forming a predetermined two bit configuration by providing a transition between said separately identifiable states at the leading edge of one of the two bit cells containing said predetermined two bit configuration unless that bit cell is preceded by a bit cell having a transition therein and responding to pairs of adjacent bits forming the complement of said predetermined two bit configuration by providing a transition between said separately identifiable states at the midpoint of one of the two bit cells containing said complement unless that bit cell is preceded by a bit cell having a transition therein, whereby said output signal contains transitions separated by at least 1½ bit cells.

27. Apparatus for encoding binary data comprising:

clocking means for forming a plurality of bit cells of substantially uniform time durations;

complementary bit pair detection means responsive to said binary data and to the clocking means for comparing the state of each bit of said data with the state of an adjacent bit of said data to produce first control pulses only upon detection of discrete pairs of adjacent bits of a predetermined bit pair configuration, neither bit of which has been previously encoded, each of said first control pulses occurring at the leading edge of one of the two bit cells containing said predetermined bit pair configuration and being separated one from the other by at least two bit cells, said detection means producing second control pulses only upon detection of discrete pairs of adjacent bits which are the complement of said predetermined bit pair configuration, neither bit of which has been previously encoded, each of said second control pulses occurring at the midpoint of one of the two bit cells containing said complement and being separated one from the other by at least two bit cells; and controlled means for providing an output signal exhibiting two separately identifiable levels, said controlled means providing a transition between said separately identifiable levels in response to either of said first or second control pulses, whereby said transitions are separated one from the other by at least 1½ bit cells.

28. Apparatus for encoding binary information comprising:

clocking means for forming a plurality of bit cells of substantially uniform time durations; and logic means responsive to said binary information and to said clocking means to provide an output signal having separately identifiable states and communicating one bit of binary information in each of said bit cells, said logic means responding to those of said bits of one binary characterization by providing a transition between said separately identifiable states at the midpoint of only those of the corresponding bit cells which immediately follow a bit cell having no transition and which are immediately followed by a bit cell containing a bit of said one binary characterization, and responding to those of said bits of the other binary characterization by providing a transition between said separately identifiable states at the leading edge of only those of the corresponding bit cells which immediately follow a bit cell having no transition and which are immediately followed by a bit cell containing a bit of said other binary characterization whereby transitions between said separately identifiable states are separated one from the other by at least 1½ bit cells.

29. Apparatus for encoding binary information for communication on a medium having two separately identifiable states comprising:

a source of binary information;

clocking means for forming a plurality of bit cells of substantially uniform time durations; and logic means responsive to said binary information from said source and to said clocking means to provide an output on said medium such that one bit of binary information is communicated in each of said bit cells, said logic means responding to those of said bits of one binary characterization by providing a transition on said medium between said separately identifiable states at the midpoint of each corresponding bit cell which is immediately followed by a bit cell containing a bit of said one binary characterization except where the bit cell is preceded by a bit cell having a transition at the midpoint thereof, and responding to those of said bits of other binary characterization by providing a transition between said separately identifiable states at the leading edge of the corresponding bit cells which are immediately followed by a bit cell containing a bit of said other binary characterization except where the bit cell is immediately preceded by a bit cell having a transition at the leading edge thereof whereby transitions between said separately identifiable states are separated one from the other by at least 1½ bit cells.

30. Apparatus for encoding binary information for communication on a medium having two separately identifiable states and for subsequently decoding the information from said medium, said apparatus comprising:

a source of binary information;

clocking means for forming a plurality of bit cells of nearly uniform time durations; and logic means responsive to said binary information from said source and to said clocking means to provide an output on said medium such that one bit of binary information is communicated in each of said bit cells, said logic means responding to pairs of adjacent bits of one binary characterization by providing a transition on said medium between said separately identifiable states at the midpoint of the bit cell corresponding to the first bit of said pairs of bits of said one binary characterization except where the bit cell is preceded by a bit cell having a transition therein and responding to pairs of adjacent bits of the other binary characterization by providing a transition between said separately identifiable states at the leading edge of the bit cell corresponding to the first bit of said pairs of bits of said other binary characterization except where the bit cell is preceded by a bit cell having a transition therein, and responding to the remaining bits by maintaining the existing state on the medium;

means for decoding said binary information from said output by responding to said transitions to detect the boundaries of said bit cells, said decoding means responding to those of said transitions occurring at the midpoint of a bit cell to register said one binary characterization in each such bit cell and in the bit cell following such bit cell and responding to those of said transitions occurring at the leading edge of a bit cell to register said other binary characterization in each such bit cell and in the bit cell following such bit cells, said decoding means registering said one binary characterization or the other binary characterization in the remaining bit cells so that no additional pairs of adjacent like bits are registered in the remaining bit cells and the binary characterization registered in the bit cell of the remaining bit cells which precedes a bit cell containing a transition is the complement of the binary characterization registered in the bit cell containing the transition.

31. A method of communicating binary information on a communication medium exhibiting two separately identifiable states and being considered to be arbitrarily divided into a plurality of substantially uniform bit cells comprising the steps of:

producing a transition between the separately identifiable states at the beginning of the first of two successive bit cells to represent that the two bit cells contain one of the four possible two bit configurations;

producing a transition between the separately identifiable states at the midpoint of the first of two successive bit cells to represent that the two bit cells contain the complement of said one of the four possible two bit configurations;

maintaining the existing state on the medium to represent that the bit cells following the second of said two successive bit cells do not contain either said one of the four possible two bit configurations or the complement thereof.

32. A method of communicating binary "ones" and "zeros" on a communicating medium exhibiting two separately identifiable states and being considered to be artibrarily divided into a plurality of substantially uniform bit cells and thereafter detecting the "ones" and "zeros" from the communication medium comprising the steps of:

1. producing a transition between the separately identifiable states at the beginning of the first of two successive bit cells to represent that each of the two bit cells contain a "one";
2. producing a transition between the separately identifiable states at the midpoint of the first of two successive bit cells to represent that each of the two bit cells contains a "zero";
3. detecting those bit cells which have a transition at the beginning and identifying the detected bit cell and the following bit cell as each representing a "one";
4. detecting those bit cells which have a transition at the midpoint and identifying the detected bit cells and the following bit cell as each representing a "zero";
5. identifying any bit cell immediately preceding the bit cells identified in step 3 and not already identified in step 4 as representing a "zero";
6. identifying any bit cell immediately preceding the bit cells identified in step 4 and not already identified in step 3 as representing a "one";
7. identifying any remaining bit cells as representing either a "one" or a "zero" such that no pairs of "ones" or "zeros" are represented other than those represented in steps 3 and 4.

* * * * *

UNITED STATES PATENT AND TRADEMARK OFFICE
CERTIFICATE OF CORRECTION

PATENT NO. : 3, 905, 029

DATED : September 9, 1975

INVENTOR(S) : Duane E. McIntosh

It is certified that error appears in the above-identified patent and that said Letters Patent are hereby corrected as shown below:

Column 1, line 45, "reversals" should read --the--.

Column 1, line 56, "reversalts" should read --reversals--.

Column 6, line 43, "AO" should read --Aθ--.

Column 6, line 47, "BO" should read --Bθ--.

Column 6, line 51, "AO" should read --Aθ-- ; "BO" should read --Bθ--.

Column 6, line 63, "AO" should read --Aθ--.

Column 6, line 66, "BO" should read --Bθ--.

Column 6, line 68, "AO" should read --Aθ--.

Column 7, line 3, "BO" should read --Bθ--.

Column 7, line 61, "BO" should read --Bθ--.

Column 8, line 5, "AO" should read --Aθ--.

Column 12, line 43, "output" should read --input--.

Column 12, line 52, "output" should read --input--.

Column 15, line 36, "type" should read --tape--.

Column 16, line 40, "as" should read --is--.

Column 19, line 58 & 59, "succession characterization interval, and for identifying the remaining bit cell intervals as" should be deleted.

Signed and Sealed this

*third* Day of *February 1976*

[SEAL]

*Attest:*

RUTH C. MASON
*Attesting Officer*

C. MARSHALL DANN
*Commissioner of Patents and Trademarks*